(12) United States Patent
Miles et al.

(10) Patent No.: US 8,380,619 B2
(45) Date of Patent: Feb. 19, 2013

(54) METHODS AND SYSTEMS FOR PROACTIVE LOAN MODIFICATION

(75) Inventors: Grant F. Miles, Salinas, CA (US); Shelley C. Turner, Elmhurst, IL (US); Richard M. Bair, Lisle, IL (US); Roy M. Witt, Charlotte, NC (US); Peter A. Sesterhenn, Libertyville, IL (US); Manping Wang, Portland, OR (US); Jin Peng, San Jose, CA (US); Yew-Young Loo, Chicago, IL (US); Ozgen Sayginsoy, Lisle, IL (US); Michael A. Beene, Rolling Meadows, IL (US); Nikhil N. Mehra, Chicago, IL (US); Ian J. Rehmert, Oak Park, IL (US)

(73) Assignee: HSBC Finance Corporation, Mettawa, IL (US)

( * ) Notice: Subject to any disclaimer, the term of this patent is extended or adjusted under 35 U.S.C. 154(b) by 77 days.

(21) Appl. No.: 12/707,067

(22) Filed: Feb. 17, 2010

(65) Prior Publication Data

US 2011/0022541 A1 Jan. 27, 2011

Related U.S. Application Data

(60) Provisional application No. 61/153,157, filed on Feb. 17, 2009.

(51) Int. Cl.
*G06Q 40/00* (2012.01)

(52) U.S. Cl. ............................. 705/38; 705/36 R; 705/35

(58) Field of Classification Search .................... 705/38, 705/36 R
See application file for complete search history.

(56) References Cited

U.S. PATENT DOCUMENTS

2006/0184450 A1* 8/2006 Ely et al. ........................ 705/38
2009/0063328 A1* 3/2009 Cuscovitch et al. ............ 705/38

* cited by examiner

*Primary Examiner* — James Vezeris
(74) *Attorney, Agent, or Firm* — Stroock & Stroock & Lavan LLP

(57) ABSTRACT

Embodiments of the invention include a computer implemented method for automatically modifying the terms of a plurality of mortgages within a portfolio of mortgages, such that, monthly payments for the plurality of mortgages are reduced. The method includes calculating a current net present value for each of the mortgages in the portfolio of mortgages. The method also includes calculating a plurality of future net present values for each of the mortgages in the portfolio, each future net present value corresponding to one set of modified loan terms. The method also includes selecting the largest calculated future net present value. The method also includes automatically modifying the loan terms of each of the plurality of mortgages where the largest future net present value is greater than the current net present value. Loan terms are modified to correspond to the modified loan terms resulting in the largest net present value.

47 Claims, 17 Drawing Sheets

METHODS AND SYSTEMS FOR PROACTIVE LOAN MODIFICATION

CROSS-REFERENCE TO RELATED APPLICATIONS

This application claims the benefit under 35 U.S.C. 119(e) of U.S. Provisional Patent Application No. 61/153,157 filed on Feb. 17, 2009 entitled "Methods and Systems for Proactive Loan Modification," which is hereby incorporated by reference herein in its entirety.

BACKGROUND OF THE INVENTION

1. Field of the Invention

This invention relates generally to loan modification. The invention also relates to more accurately determining when to modify a loan to maximize the value of a loan portfolio. The invention also relates to using multiple criteria when determining how to modify a loan.

2. Description of the Related Art

Customers borrow money in the form of mortgages to purchase homes. These mortgages (loans) can be for a certain period of time, such as 5, 15, or 30 years. These mortgages can have adjustable or fixed rates. Adjustable rates may be adjusted periodically to correspond with prevailing interest rates.

In general, customers who are considered at a lower risk for default are given the best rates. Customers will sometimes fall behind on payments, making partial payments, or completely failing to make payments. Falling behind on payments can result in a default, and eventually, in foreclosure. In response, the lender will sell the home and apply the proceeds to the mortgage. If the mortgage is greater than the proceeds, the lender will take a loss.

To account for the risk that a borrower will be unable to make payments, and that the home will have to be sold for a loss, lenders charge an appropriate interest rate. In some cases, when a borrower is unable to make payments, the terms of a mortgage may be renegotiated with a borrower. This renegotiation may result in the terms of a loan being modified.

SUMMARY OF THE INVENTION

Embodiments of the invention are directed to loan modification. Embodiments of the invention include a computer implemented method for automatically modifying the terms of a plurality of mortgages within a portfolio of mortgages, such that, monthly payments for the plurality of mortgages are reduced. The method includes calculating a current net present value for each of the mortgages in the portfolio of mortgages. The method also includes calculating a plurality of future net present values for each of the mortgages in the portfolio, each future net present value corresponding to one set of modified loan terms. The method also includes selecting the largest calculated future net present value. The method also includes automatically modifying the loan terms of each of the plurality of mortgages where the largest future net present value is greater than the current net present value, wherein the loan terms are modified to correspond to the modified loan terms resulting in the largest net present value.

Embodiments of the invention also allow a customer to opt-out of the automatic loan modification for a period of time. Embodiments of the method also include retracting the modified loan terms in response to a mortgage customer's failure to comply with the terms of their modified mortgage.

Embodiments of the invention also include using at least one of market, customer, and product risk factors.

Embodiments of the invention also include a computer implemented method for automatically modifying the terms of a plurality of mortgages within a portfolio of mortgages, such that, monthly payments for the plurality of mortgages are reduced. The method includes determining a customer's eligibility for a first loan modification using a first set of rules, wherein eligibility is based on at least disposal income. The method also includes determining a customer's eligibility for a second loan modification using a second set of rules, wherein eligibility is based on the net present value of the loan, and determining net present value comprises calculating a plurality of future net present values for the customer's mortgage, each future net present value corresponding to one set of modified loan terms. The method also includes selecting the one of the first and second loan modification providing the greatest payment relief to the customer. The method also includes automatically modifying the loan terms of the customer's mortgage in accordance with the selected loan modification.

BRIEF DESCRIPTION OF THE DRAWINGS

Various objects, features, and advantages of the present invention can be more fully appreciated with reference to the following detailed description of the invention when considered in connection with the following drawings, in which like reference numerals identify like elements.

DETAILED DESCRIPTION OF EMBODIMENTS OF THE INVENTION

Figure 1:
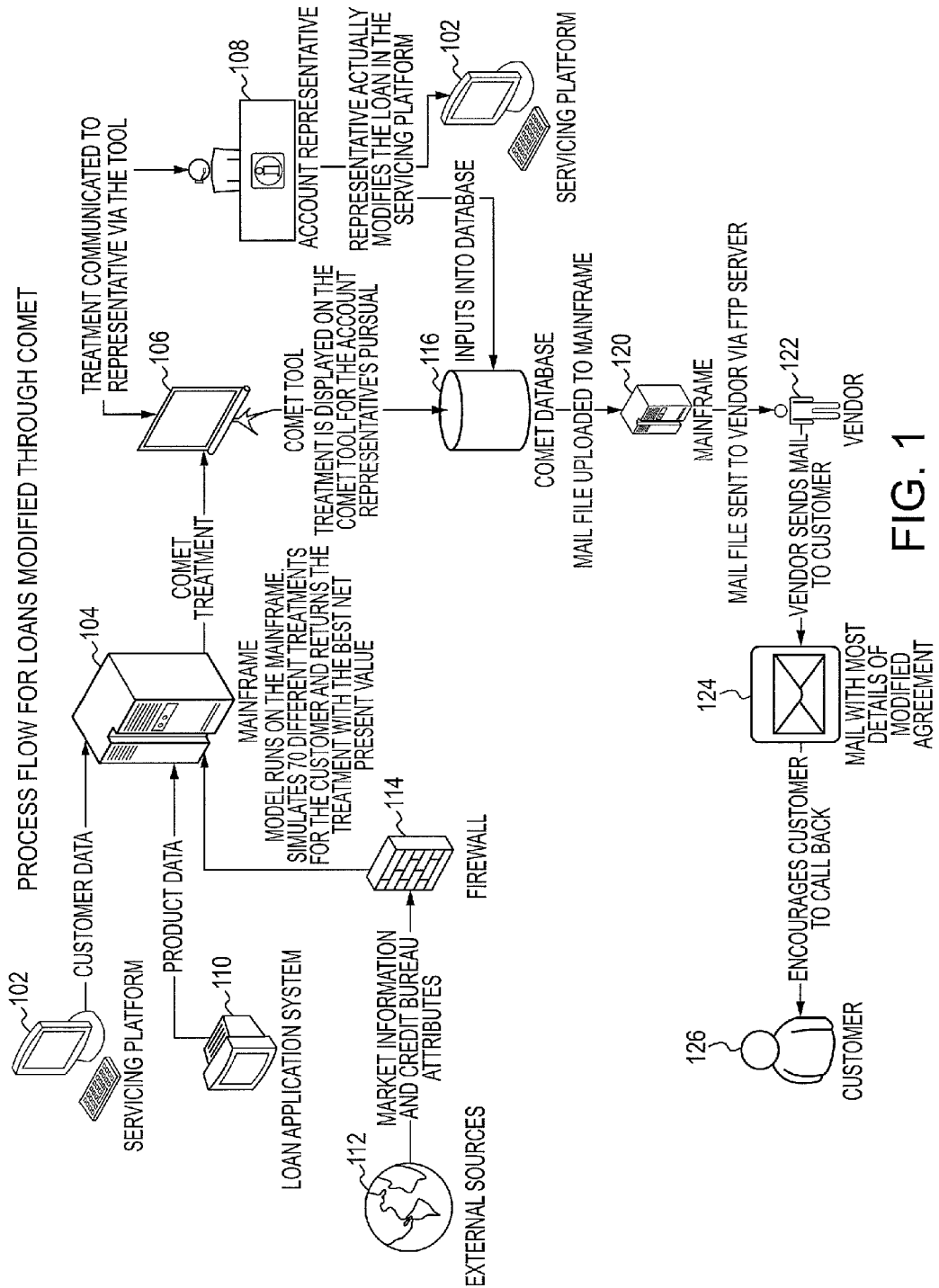
FIG. 1 is a system diagram showing the overall architecture of COMET.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

Embodiments of the invention are directed to proactively and automatically modifying the terms of a borrower's loan to reduce the risk of default. By reducing a borrower's risk of default, the borrower is more likely to continue making payments on the mortgage, thereby avoiding the need to foreclose on the property and possibly taking a loss on the eventual sale of the property.

Embodiments of the invention include creating and validating a model for predicting a borrower's delinquency and the expected loss from delinquency. This model includes segmenting borrowers to more accurately predict probability of default. By calculating how various modifications to the terms of a borrower's loan (or an entire portfolio of similarly segmented loans) will affect the probability of default, the lender can easily determine what loan modification terms will result in the loan having the highest value for the lender. Larger loan modifications may reduce the probability of default, but will also cost the lender more. By calculating each of the possibilities, the combination that results in the greatest net present value (when considering loss given default) can be selected.

In accordance with the determined loan modification terms, the borrower's loan is automatically modified and they are notified of the modified terms (e.g. email, mailing, automated phone call, live call). The borrower then makes payments in accordance with the modified terms. In addition, borrower's can opt out of the modified loan terms, for example, by declining within 30 days. Further, feedback from actual delinquencies and losses from these delinquencies can be fed back into the model to updated and improve the predictions being made. Modifications to the terms for a borrower's loan can be specific to that borrower and based on their specific financial situation. In some embodiments of the invention, second or further loan modification can be provided to a borrower after the term of a first loan modification has been completed. In this way, although a first loan modification has not been successful, further modifications can be made to attempt to maximize the value of the loan for the lender and to avoid foreclosure.

The probability that a borrower will go delinquent can be based on a formula using many different factors (i.e. multi-dimensional risk factors). These factors can include consumer risk (e.g. credit score, income, payment history, other debt, and joint loan). Based on an analysis of these factors, the borrower can be assigned risk categories, such as, high medium or low. A greater or fewer number of risk categories can be assigned. In addition categories can be numerical, such as 3 on a 10 scale.

The probability of default can be determined from historical default data, for example, by performing a regression analysis of other loans, loan modifications, and default outcomes. The regression analysis (and equations) can be based on the borrower's segmentation, the amount of relief, and whether this is a first lien or a second lien. This probability of default can then be adjusted using stress factors to account for how representative (or not) the historical data used for generating the regression equations were. In addition, term adjustment factors can also be applied. These term adjustment factors can account for the fact that the data used for generating the regression equation was based on a specific modification term (e.g. 24 months), but that a probability of default for another modification term (e.g. 36 months) is also desired. Another adjustment factor than can be applied is the delinquency bucket of the borrower. Many other factors can also be used in determining the probability of default, including multiple account level characteristics, account level inputs, and analytics inputs.

The factors for determining delinquency can also include product risk factors (e.g. fixed rate loan, variable rate loan, PHL, loan to value, lien position, verified income, secured plus loans). Based on an analysis of these risk factors, the borrower can be assigned a risk category, such as, high medium or low. A greater or fewer number of risk categories can be assigned. In addition categories can be numerical, such as 3 on a 10 scale.

The factors for determining delinquency can also include market risk factors (e.g. geographical location, housing prices in a location or overall, housing price indexes, real disposable income per capita, unemployment rate, job data, and industry loan to value ratio). The geographical location can be based on address, zip codes, counties, states, metropolitan divisions, or any other type of geographical grouping. The other market factors can include macro economic data and information that affect more than an individual. For example, an affordability index for a state. Based on these market risk factors, a borrower can be categorized into a risk category, including time dimensional risk categories (e.g. HH, HL, LH, and LL). Categories can be used to cluster market areas (e.g. geographical areas). Similar to above, based on an analysis of these factors, the borrower can be assigned a risk category, such as, high medium or low. A greater or fewer number of risk categories can be assigned. In addition categories can be numerical, such as 3 on a 10 scale.

Embodiments of the invention also include determining the loss to a lender when a borrower defaults. This is an important consideration when making loan modifications. A lender has an incentive to ensure a customer (borrower) does not default, especially when the expected loss is large. A lender may provide more generous loan modification terms to a borrower (saving them more money) when the expected loss is large. This is to increase the probability that the borrower will not default.

Loss given default can be understood as the net realizable value of a property. This is the sales price minus various foreclosure and REO costs. REO is real estate owned, and refers to costs of going through the foreclosure process, such as, eviction, taxes, maintenance, and real estate agent costs. Various (including combining) property estimation methods can be used. One is an automated value model, this can be provided by outside vendors. Another property estimation method that can be used is property market value at loan origination adjusted by various factors, for example, a housing price index (HPI) appreciation/depreciation rate. Overall, the process for determining loss given default (LGD) using a property market value is calculating the HPI appreciation/depreciation rate since origination for the loan, multiplying the origination property appraisal value by HPI rate to get an indexed value, using regression equations (for example derived for each region and index value) to calculate property value, using balance plus foreclosure and REO costs and subtracting the property value, and using regression equations quarterly based on most recent HPI values.

Multiple factors can be used for determining a borrower's probability of default and a loss given default. These factors can include customer risk, product risk, and market risk, which can be combined to segment borrowers into different risk categories. These risk categories can then be similarly treated when loan modifications are determined and applied. In addition, actual data can be fed back into the model and analysis (including categorization) to determine if the loan modifications had the intended effect, and were consistent with predictions regarding loan delinquency and loss given default. In some embodiments of the invention, these multiple risk factors can also be combined with LGD to segment borrowers into different risk categories. In this way, borrower's can be segmented by risk and probability of default, so that more generous loan modifications can be provided the high risk borrower's where LGD is also large.

Embodiments of the invention also include filtering out borrowers from the loan modification process. This may be done to reduce administration costs (e.g. modify loans for fewer borrowers), to reduce overhead (e.g. only high LGD loans are modified), or reduce defaults (e.g. only high risk borrower's loans are modified). Filtering can also be based on disposable income. For example, a borrower must be within a threshold amount of disposable income before any loan modification will be considered. This threshold amount of disposable income can be indexed by geographical, metropolitan area, and/or zip code. Disposable income can be calculated as net income minus fixed expenses and PITI (principal and interest, tax and insurance payments on all mortgages). The threshold amount can also be adjusted by CPI. Other filtering may include only doing loan modifications for borrower's that are delinquent for a certain amount of time (e.g. 30 days past due, 60 days past due) or borrower's that have been delinquent a certain number of times. Other filtering may include LGD limits, thereby avoiding making modifications to a loan when only small loses are expected to be avoided. Other filtering may include payment limits, whereby modifications are only made to a loan if payments are expected to be reduced by at least a certain amount. Other filtering may include filtering entire segments if they do not contain enough loans to be modified. Other filtering can include the segment the borrower was put into.

After the terms of a loan have been modified, the borrower can be notified of the modified terms and their new lower payment amount. Notification can be through the mail, email, phone, or a website. If the borrower does not desire the modified terms and loan payment, they can opt-out, for example, through an email or a phone call. Borrowers can then make payments according to their current method of payment (e.g. check, direct debit, credit).

Embodiments of the invention can be implemented on a computer system with software capable of analyzing risk factors and making categorization decisions. For example, embodiments of the invention can be implemented on a mainframe computer capable of executing the appropriate software with the loan modification models. These models include the probably of default and loss given default predictions. Alternatively, the software can be executed on a computer server, or an array of computer servers working together. Storage can be done though hard disk, RAID disk arrays, or storage area networks.

The computer system can be connected to the data sources needed for performing the analysis. These data sources include for a borrower, loan-level customer data, loan product and category, property information, external demographic data, market data, employment data, affordability data, and other economic data. This data also includes market information. This data can be provided from standard Accounts Receivables (AR) systems, such as MortgageSery offered by Fiserv. These data sources may be provided by other servers, outside vendors, or imported databases, and may be remotely located from the loan modification system itself. The data can be retrieved using the Internet or a corporate intranet or WAN.

Based on the data, the software calculates a customized customer-specific loan modification treatment. In some embodiments of the invention, customer facing systems and customer service representatives access a database of information that is generated by the loan modification server and system. The loan modification system analyzes a borrower's information and other data sources, and then generates loan modifications. The modifications can be incorporated periodically into a database accessed by customer facing representatives. This increases the security of the system and allows the loan modification system to operate on large batches of data. Customer support can be maintained even when backend system are being updated.

A graphical user interface can be used to browse or search through the database, for example, by borrower (customer) identification codes. The database can be accessed through a web interface, where links can be selected to obtain additional information. This additional information can include the new terms of the loan, and other information, such as the risk factors and other data used to arrive at the loan modification. This can be important if there was an error in the data.

In some embodiments of the invention, multiple loan modification options can be presented. A customer service representative, or the borrower themselves, can then choose from among the options depending on the borrower's knowledge of their specific financial situation. One borrow may know they need more long term assistance (e.g. 1% for 12 months), while another borrower may know they need more short assistance (e.g. 2% for 6 months). These various options may represent be the same or similar concessions for the lender, thereby not changing the analysis (e.g. both costing the lender $2500), but may allowed the borrower to choose what is most likely for them to avoid foreclosure. Customer service representative can also be used to make further modifications to a borrower's loan based on a specific consultation, thereby override the original automatically generated modification.

In yet other embodiments, customer's themselves can access the front end database and system, for example, through a web application. In this way customers can manage their own loans and learn the new payment information. Alternatively, in those embodiments where multiple options are present to the borrower, they can select from among them. Alternatively, the customer can access the front end database and application through a telephone exchange and a interactive voice response system or customer service representative. Firewalls can also be used to provide additional information security for the lender and their front end application, as well as to provide protection against viruses or other malicious software.

Embodiments of the invention can be implemented through customized software, or applications written for standard statistical packages like SAS. Models can be created and executed using SAS. Overall the loan modification system can be designed as a client server system with a client (e.g. web based and over the Internet or intranet) used to manage and executed the models on the loan modification system. Alternatively, native applications such as SAS can be used to apply the models to incoming data and information. Similarly front end system can updated themselves and their databases automatically, for example, periodically (e.g. every hour, every day) with the latest information from the loan modification system. The front end system can also be design as a client server system accessed over a communication network, for example, the Internet or an intranet. The front end system can be implemented as a web based system using standard web technologies such as HTML, Java, and JavaScript. The database can be supported using known database systems, such as relational databases.

Embodiments of the invention can also be connected to automated dialing machines, e-mail systems, and mailing systems, so that borrowers can be notified of changes to their loans, or other information about payments. Notifications may be dependent on a borrower's risk categorization, so that higher risk borrower's are contacted sooner, more frequently, or receive different types of information. Payment processing systems can also be used and provide information to loan modification or accounting systems, so that the efficacy of loan modifications can be determined, including when an how much borrower's pay under the modified loan terms.

Embodiments of the invention can also be used in combination with other loan modification programs. For example, customers can be considered for both loan modification programs at the same time, with the customer receiving the loan modification resulting in at least one of the lowest monthly payment and greatest overall relief. Alternatively, the customer can be offered the loan modification resulting in the largest net present value of the loan to the lender.

In some embodiments of the invention, the loan modification programs can be based on different criteria. For example, a first loan modification program can be available to customers in certain situations (missed payment, already in foreclosure, not in default). As another example, a loan modification program can be based on a customer's disposable income or ability to afford a particular mortgage, with the modification focused on making it more affordable. As another example, the loan modification can be based on providing the lender with the greatest net present value of the loan. By considering a customer for multiple loan modification programs, a customer is more likely to obtain relief that will allow them to avoid foreclosure. Further, the lender can have more flexibility in management of its mortgage portfolio.

FIG. 1 is a system diagram showing the overall architecture of COMET. The architecture includes, a servicing platform 102 for providing customer data, a loan application system 110 for providing product data, and a mainframe 104 for performing modeling and determining the best loan modification for a particular customers and their loan product. The architecture also includes external sources of market information 112, which can be provided to the mainframe 104 through firewall 114.

The architecture also includes the COMET tool 106, which is used by an account representative 108 to apply a loan modification. The loan modification can also be applied automatically by the COMET tool 106 in a proactive manner. This loan modification information is stored in COMET database 116. The loan modifications are uploaded to mainframe 120 for notifications to the customer. This is done by vendor 122, which sends a notice 124, received by customer 126.

Servicing platform 102 is a system used for servicing mortgages. It is a standard account receivable platform for managing collections of payments. It provides an interface to other backend accounting and processing systems. Example of servicing platforms include MortgageSery and FiServ.

Loan application system 110 is an electronic application system (e.g. web based) that allows a customer, or a customer service representative assisting a customer, to apply for a loan product. This loan application system can be used both for a customer applying for a new mortgage (e.g. a 30 year fixed mortgage) and application for a loan modification. After the customer has completed the process of applying for a loan modification, that information can be sent to mainframe 104 to determine what loan modification would be most profitable for the lender. In some cases, this may be a change to the rate (temporary or permanent), forgoing payments, a reduction of the loan amount, or the type of loan (term, fixed or arm). Temporary modifications to the loan can be made permanent once the customer has complied for the terms of a loan modification for a certain period of time (e.g. 6 months).

Mainframe 104 is used to calculate the different loan modifications and determine what would be most profitable for the lender. Further details of the model, how to develop a model, and calculation using the model are describes with respect to the figures below. The models used by Mainframe can be updated with information 112 from the market (e.g. price indexes or foreclosure statistics), credit bureau information about a customer, and the results of previous loan modifications. This information can update various factors in the model used to determine which loan modification will be most profitable. These external information sources are connected to mainframe 104 through firewall 114. This increases security and helps protects the information inside mainframe 104.

COMET tool 106 is a system that manages the loan modification and communicates with mainframe 104 to determine the best modification for a loan (if any). The functionality of COMET tool 106 and mainframe 104 can also be combined into one system. COMET tool 106 can be used by a customer service agent to apply a loan modification to a customer's loan (see FIGS. 13-16), or it can be used to automatically analyze a customer's current loan, determine if a loan modification would be more profitable than the current loan, and automatically notify a customer that their loan has been modified, with or without the ability for a customer to opt-out.

All, or a portion, of the loans in a customer's portfolio can be automatically analyzed for loan modification. Filtering may be done so that only certain customers' loans may be modified. Filters can include not modifying those loans where the profit is likely to be small (e.g. below a determined threshold dollar amount ($100)), and/or where administration are likely to be too costly. Filtering can also include only modifying those loans where a large benefit will be received (or modifying those loans first). Filtering can also include modifying only those loan that pose a large risk to the lender (e.g. only high LGD loans are modified and/or only high risk borrower's loans are modified). Filtering can also be based on disposable income. For example, a borrower must be within a threshold amount of disposable income before any loan modification will be considered. This threshold amount of disposable income can be indexed by geographical, metropolitan area, and/or zip code.

COMET database 116 is a database storing the competed loan modification treatments. Follow up information on the loan modification can also be stored in this database, and then provided to mainframe 104 allowing it to more accurately determine the most profitable loan modification.

Mainframe 120 can be used to process completed loan modification (either automatically performed or by customer service rep) and through vendor 122 can mail a notification 124 to a customer. Alternatively, COMET tool 106 or mainframe 120 can directly notify a customer through one or more methods including, an email, a letter, a phone call, a voice mail, or a text message. Each one of these communication can include instructions on how a customer can opt out of the loan modification.

Account representative 108 can use COMET tool 106 when working on a loan modification with a customer. They can also access information in servicing platform 102 to understand more about a customer's current mortgage and other relevant information (payment history, property location, etc.)

Figure 2:
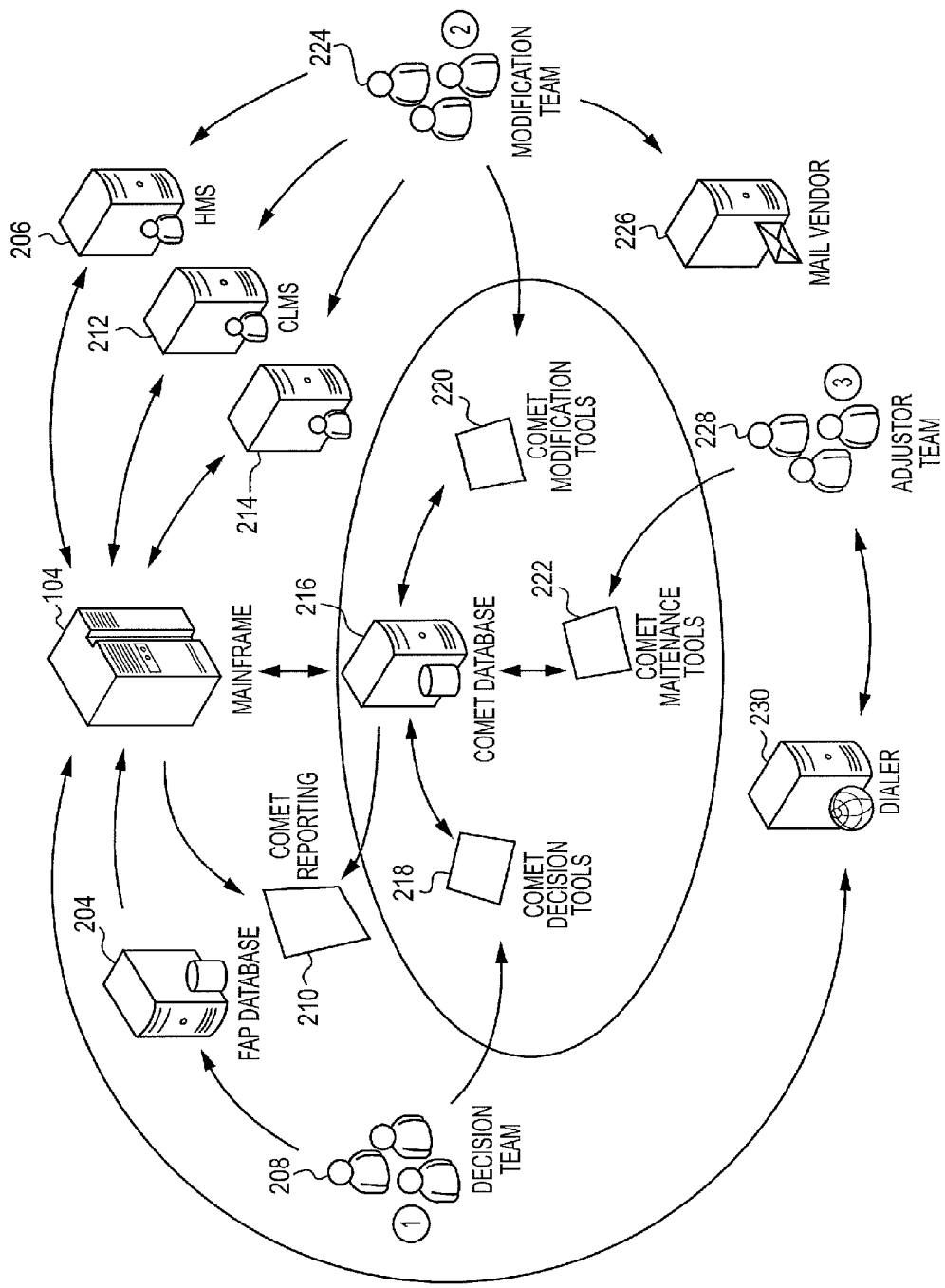
FIG. 2 is a system diagram showing further details of the COMET architecture and its users.

FIG. 2 is a system diagram showing further details of the COMET architecture and the flow of data between different systems and its users. This architecture includes, multi-level security for various access groups, automatic synchronization with existing FAP databases, daily dialer feeds for campaign and queue adjustments, AR system alert and flagging mechanism for CII, CL MS, and HMS, data extracts for both SAS and actuate reporting, and user friendly navigation, error-proofed forms, and predictive input selection.

A decision team 208 can use the COMET decision tools, connected to COMET database 216, COMET maintenance tools 222, and COMET modification tools 220, to make a loan modification decision.

The adjustor team is customer facing and works with a customer to obtain information about their financial situation, as well as financial information and other relevant information. Adjustor can also discuss the one or more options available to the customer, including one or more loan modification programs they may be qualified for.

The Modification team serves in the role of underwriting and fulfillment. After an adjust has worked with a customer to collect the necessary information, they verify and collect any additional information. They also receive the different loan modifications available under, for example, the FAP and COMET loan modification programs. Using this information they can provide a specific loan modification to a customer.

Mail vendor 226 is used to mail a notification to a customer that their loan has been modified. Dialer 230 can also be used to notify a customer that their loan has been modified.

FAP refers to a foreclosure assistance program, it is a loan modification program designed to assist customers to avoid foreclosure. FAP database 204 stores information about the assistance and the result of providing the assistance during the loan modification. FAP is based mainly on disposable income criteria. If the customer meets the rules for this program, barring certain exceptions, they can receive a loan modification under the program. The income criteria can be based on determining a customer's disposable income available to pay the mortgage and after necessities have been subtracted. The threshold for disposal income as a percentage of total income can depend on the customer's location. Further, utilities and other expenses are obtained from the customer.

The FAP loan modification then tries to offer a loan modification that would make monthly payments affordable in view of the customer's disposable income. But if a customer's income is too low, there may not be a monthly payment amount that can be provided by the lender that is low enough such that the borrower could pay the monthly amount. Alternatively, the customers overall income or disposable income may be too high to qualify for the FAP loan modification program.

Information on the FAP loan modification goes into a database, such that is can be used for comparing to other loan modification program options, and for understanding the success of loan modifications.

Figure 3A:
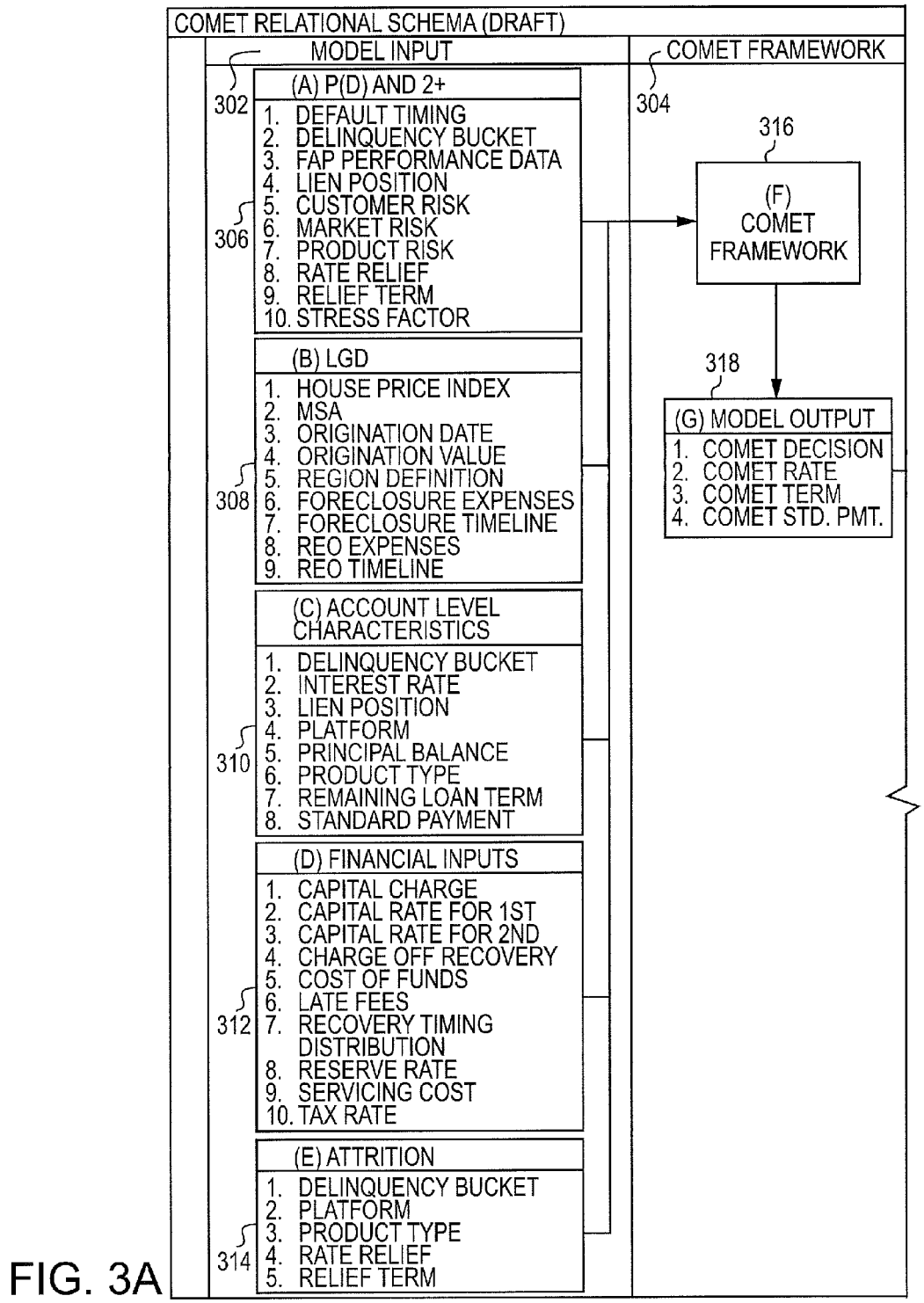
FIG. 3A is a diagram showing the components of the COMET model.

FIG. 3A is a diagram showing the components of the COMET model. These are various pieces of information that can be used at input to the COMET model that is used to determine which loan modification for a given customer will be most profitable for a lender.

The COMET model can include the probability of default 306, which can be determined based on one or more of the default timing, a delinquency bucket, Foreclosure Assistance Program (FAP) performance date, the lien positions, customer risk, market risk, product risk, rate relief, relief term, and a stress factor.

The COMET model includes the Loss Given Default (LGD) 308, which can be determined based on one or more of, house price index, MSA (Metropolitan Statistical Area), origination date, origination value, region definition, foreclosure expenses, foreclosure timeline, REO expenses, and REO timeline. An MSA is a grouping of like areas together, that are geographically related. It can be broader or different than a zipcode.

The COMET model can also include Account Level Characteristics 310, which can be determined based on one or more of delinquency bucket, interest rate, lien position, platform, principal balance, product type, remaining loan term, and standard payment.

The COMET model can also include Financial inputs 312, which can be determined based on one or more of a capital charge, a capital rate for a 1st, a capital rate for 2nd, charge off recovery, cost of funds, late fees, recovery timing distribution, reserve rate, servicing cost, and tax rate. Capital rate is the portion of the loan that the lender will provide for the funds to purchase a property, borrowing the rest from another lender.

The COMET model can also include Attrition 314, which can be determined based on one or more of a delinquency bucket, platform, product type, rate relief, and relief term.

All of these are input into the COMET model 316 to generate an output decision 318. This decision consists of a decision (modify or do not modify), a rate, a term, and a modified standard payment (the modified monthly payment a customer will be making).

Figure 3B:
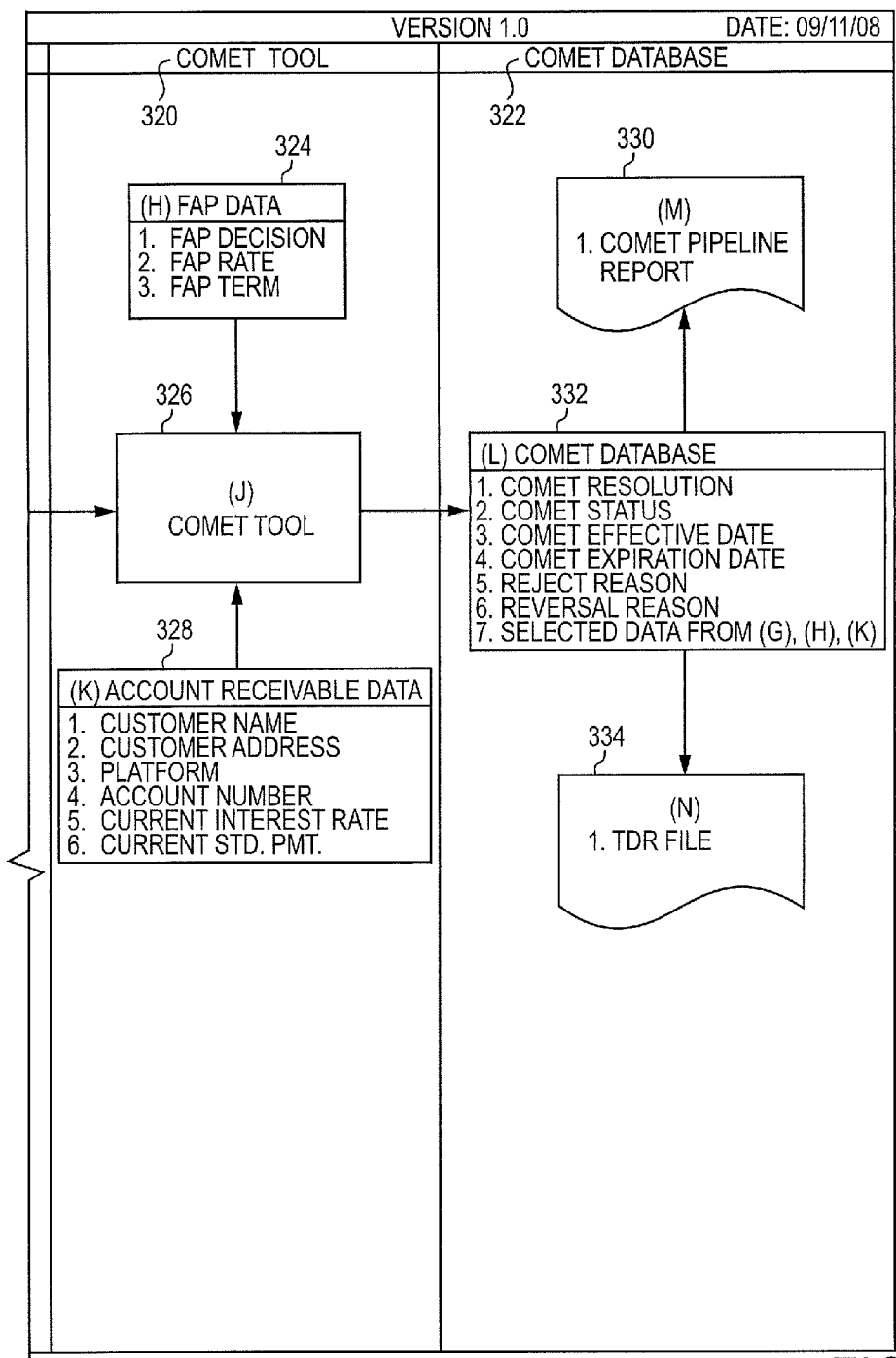
FIG. 3B is a diagram showing the components of the COMET model.

FIG. 3B is a diagram showing the components of the COMET model. The output is presented within the COMET tool 326, which also incorporates information from FAP data 324 and Account receivable data 328. This FAP data 324 includes FAP decisions, the FAP rate, and the FAP term. Account receivable data includes customer name, customer address, platform, account number, current interest rate, and current standard payment. The output of the COMET tool 326 is send to COMET database 332. The output stored in COMET database 332 can include, the resolution for the case, the status, the effective date, the expiration date, the reject reason, the reversal reason, and delectated information from model output 318, FAP data 324, and account receivable data 328.

The output of COMET database 332 can be a COMET pipeline report 330 and/or a TDR file 334. The pipeline report describes the status of loan modification that are in process. It can describe where in the process a loan is, as well as summary data. This summary data can include what percentage of loan modifications started were completed or what percentage of loan modification were denied. The TDR file (troubled debt reserve) is used to report data to relevant accounting systems for loans that were modified. This data is used to make adjustments to portfolio values.

Figure 4:
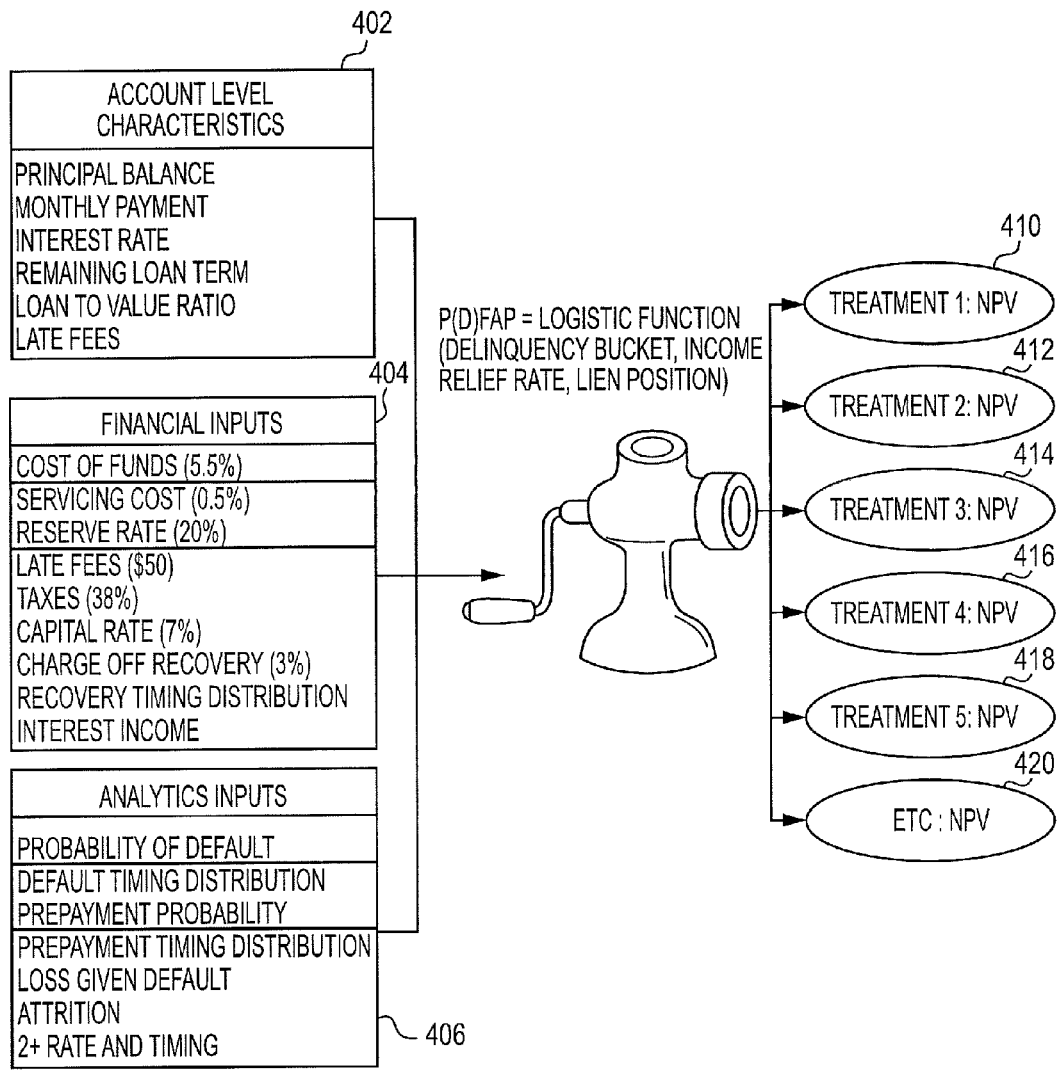
FIG. 4 is a diagram showing details of the COMET model and its inputs.

FIG. 4 is a diagram showing details of the COMET model and its inputs. Various inputs and assumption are used to develop a model that can determine the net present value (NPV) for a particular customer for a given treatment option. By determining the NPV, it can be determined which (if any) loan modification (i.e. 410-420) would be most profitable (i.e. with the optimal net present value).

The NPV gives a basis for decisioning on a loan modification, and the cost of that loan modification to the lender. The model helps the lender determines which loan modifications will result in an increased NPV of the loan. In some embodiments the COMET model can be used to determine the modification that will result in the greatest increase in NPV for the modified loan. Because a loan modification has costs to the lender, such as receiving lower payments from the customer, not all loan modifications may increase the NPV. However, certain modifications, because they reduce the probability of default, can result in a greater NPV for the lender.

In further detail, in accordance with some embodiments of the invention, for a given treatment option to be viable in loss mitigation, it is necessary that the net present value (NPV) of future expected cash flows (CF) with the treatment exceeds the NPV of future expected CF without the treatment. Besides the fact that the NPV of a given treatment varies from account to account, there also exists a large set of possible treatments for each account. Therefore, given an account that is a candidate for loss mitigation, it is necessary to compute the NPV of CF related to each treatment option such that the treatment with the highest NPV of CF can then be recommended. It is possible, however, that the NPV of no treatment (business as usual (BAD)) is found to be better than the NPV of any treatment option, in which case no treatment would be recommended.

The NPV framework considers all future cash flows over the life of the loan. It takes into account the improvement in default probability, loss given default, estimated customer attrition and various other costs incurred during the life of the loan. Factors considered in the model include, Interest Income, Cost of funds, Net Credit Margin, Cost to Service, Income before Tax, Net Income, and Cash.

The factors that can go into the NPV model can include Account Level Characteristics 402 such as principal balance, monthly payment, interest rate, remaining loan term, loan to value ratio, and late fees. Other factors that can go into the model include Financial Inputs 404 such as cost of funds, servicing cost, reserve rate, late fees, taxes, capital charge, capital rate for 1st, capital rate for 2nd, charge off recovery, interest income, recovery timing distribution. Other factors that can go into the model include Analytic Inputs 406, such as, probability of default, default timing distribution, prepayment probability, prepayment timing distribution, loss given default, 2+ rate and timing. Embodiments of the invention can use one or more of these factors to calculate the NPV of a loan.

When computing the expected future cash flows related to a given account, many factors can be considered: probability of default (PD), loss given default (LGD), loan characteristics (such as principal balance, interest rate, team, LTV, etc.), and financial variables (such as taxes, cost of funds, late fees, reserve rate, charge-off recovery, etc.). One way to conveniently evaluate all the possible treatment options for a given account is to construct a simulation experiment that takes in as input all the factors listed above and outputs the NPV of expected future CF associated with each possible treatment.

The set of possible treatments is comprised of feasible sets of rate reduction, term extension, partial write-down of the principal balance, or any combination of the three. The goal of any treatment is to provide the customer with income relief so as to increase the chances that the customer will keep making payments on the account, effectively reducing the probability that the customer defaults over a given time period. The reduction in PD depends on the level of income relief (as a percent of the payment) which, in turn, is determined by the treatment option. It is possible to gauge the magnitude of reduction in PD as a function of income relief by using historical performance data from the Foreclosure Avoidance Program (FAP).

When computing the NPV of different treatments, the cash flow of a given treatment in each period is discounted by the cost of funds rate to the present value and all discounted values finally added together. The cash flow in each period is determined by the financial incomes and expenses that are incurred during that particular period. The incomes include, for example, interest income, late fees, etc, while expenses include provisions (e.g. charge off, reserve charges), taxes, cost to service, etc. Financial assumptions are made for the following inputs Cost of Funds, Late Fees, Tax Rate, Servicing Cost, CPR, Recovery Rate, Reserve Rate, Capital Rate, Capital Charge, REO Capital, REO Carry Cost, Recovery Rate Year 1-5, Recovery Rate Year 6-10, and Recovery rate year 11+. These assumption depend on the mortgage portfolio being analyzed.

The major processes in computing the NPV include: (1) Probability of default modeling: Probability of default is modeled as a logistic function of the delinquency bucket, income relief rate and lien position using historical FAP data (any other historical data can also be used); (2) Term-adjusted probability of default: PD modeled using historical FAP data is representative of approximately a 24-month treatment term. In order to obtain PD for treatments of different durations, 24-month PD has been term-adjusted; (3) Probability of default stress factors. (4) Market-product-customer risk adjusted PD. However, it is possible to use the recent delinquency performance of the (business as usual (BAU) population of accounts to project PD onto the market, product and customer risk segments; (5) PD adjustment by delinquency bucket: PD function based on FAP was adjusted at the delinquency bucket level to reflect the relative delinquency performance of the general BAU population so that the adjustment factors based on market-product customer segmentation could be appropriately applied; (6) Final Stressed PD Tables for CL and HMS. In some embodiments, stress factors are applied to account for an increase in delinquency from previous years. Historical information can be used to develop the stress factors.

Further details on modeling the probability of default in accordance with one embodiment of the invention will now be described. The response of the probability of default to variations in income relief was evaluated within a logistic regression framework by using historical data from the Foreclosure Avoidance Program (FAP). Given an account i from the CL portfolio that was approved for FAP between September '04 and February '05, the default of account i is said to have occurred if a given account resulted in charge-off or loss on sale within 27 months after FAP approval (observed time window following approval). Twelve percent or 241 out of 2001 accounts that were approved for FAP between September '04 and February '05 resulted in charge-off or loss on sale within 27 months after approval). For example, for i=1, 2, ..., 2001, define, $$D_i = \begin{cases} 1, & \text{if account } i \text{ resulted in } C/O \text{ or } LOS \text{ within 27 months of } FAP \text{ approval} \\ 0, & \text{if account } i \text{ did not result in } C/O \text{ or } LOS \text{ within 27 months of } FAP \text{ approval} \end{cases}$$

$$relief_i = \frac{\text{pretreatment } payment_i - \text{posttreatment } payment_i}{\text{pretreatment } payment_i} \times 100,$$

$$bucket_i = \{Current, X-day, 30s, 60s, 90+\},$$

$$lien_i = \{1st, 2nd\}.$$

Then, the logistic regression model of the binary dependent variable $D_i$ is given by, $$P(D_i = 1 \mid bucket_i, relief_i, lien_i) = F(\beta_0 + \beta_1 bucket_i + \beta_2 relief_i + \beta_3 lien_i)$$

$$= \frac{1}{1 + e^{-(\beta_0 + \beta_1 bucket_i + \beta_2 relief_i + \beta_3 lien_i)}},$$

where $F(\cdot)$ is the cumulative standard logistic distribution function and $\beta_0$, $\beta_1$ and $\beta_2$ are the regression coefficients.

The coefficients of the logistic regression model were estimated using SAS by the method of maximum likelihood. The maximum likelihood estimators are consistent and asymptotically normally distributed so that t-statistics and confidence intervals for the coefficients can be constructed in the standard manner. For details, refer to, for example, Stock, J. H. and M. W. Watson, "Introduction to Econometrics, 2nd Edition," Boston, Mass.: Addison Wesley, 2007 (pp. 384-420)). The coefficient estimates are reported below with standard errors in parentheses, where $\hat{P}(\cdot)$ denotes the estimated probability:

$$\hat{P}(D_i = 1 \mid bucket_i, relief_i, lien_i) =$$

$$F\left(-\underset{(0.241)}{2.11} - \underset{(0.467)}{1.47} Relief_i + \underset{(0.213)}{0.46} DLien_i + \underset{(0.218)}{0.52} DXday_i + \underset{(0.221)}{0.69} DThirties_i + \underset{(0.241)}{0.96} DSixties_i + \underset{(0.231)}{1.38} DNineties_i\right),$$

where the following indicator variables were introduced for lien position and delinquency bucket, $$DLien_i = \begin{cases} 1, & \text{if account } i \text{ is } 2^{nd} \text{ lien} \\ 0, & \text{otherwise,} \end{cases}$$

$$DXday_i = \begin{cases} 1, & \text{if account } i \text{ is in the } X-\text{day bucket} \\ 0, & \text{otherwise,} \end{cases}$$

$$DThirties_i = \begin{cases} 1, & \text{if account } i \text{ is in the } 30s \text{ bucket} \\ 0, & \text{otherwise,} \end{cases}$$

$$DSixties_i = \begin{cases} 1, & \text{if account } i \text{ is in the } 60s \text{ bucket} \\ 0, & \text{otherwise,} \end{cases}$$

$$DNineties_i = \begin{cases} 1, & \text{if account } i \text{ is in the } 90s \text{ bucket} \\ 0, & \text{otherwise.} \end{cases}$$

Note that all the estimated coefficients are statistically significant at 1% significance level or smaller. The null hypothesis that all regression coefficients (except intercept) are jointly equal to zero is strongly rejected at 1% significance level (LR=57.3~$\chi_6^2$ with a p-value less than 0.001). The c-statistic for assessing the predictive ability of the model is equal to 65%, indicating that the model has adequate power in explaining probability of default, however, that there is still room for improvement.

The c-statistic is a measure of the discriminative power of the logistic model. It varies from 50% (the model's predictions are no better than chance) to 100% (the model always assigns higher probabilities to correct cases than to incorrect cases for any pair involving $D_i=0$ and $D_i=1$). Thus, c is the percent of all possible pairs of cases in which the model assigns a higher probability to a correct case than to an incorrect case. More formally, a pair of observations with different observed responses is said to be concordant if the observation with the lower ordered response value has a lower predicted mean score than the observation with the higher ordered response value. If the observation with the lower ordered response value has a higher predicted mean score than the observation with the higher ordered response value, then the pair is discordant. If the pair is neither concordant nor discordant, it is a tie. Suppose there is a total of t pairs with different responses, $n_c$ of them are concordant, $n_d$ of them are discordant, and $t-n_c-n_d$ of them are tied. Then, $c=(n_c+0.5(t-n_c-n_d))/t$. Fitted values from the model are transformed and plotted below by delinquency bucket and lien position for a visual illustration of the estimated relationship between the probability of default and income relief rate.

Term-Adjusted Probability of Default

In the development sample, approximately 15% are on a permanent FAP program while 25% are re-ups (customers who have participated in the program for at least twice) and 60% are on a 6-month program. All the permanents and re-ups can be assumed similar to a 60-month program yielding an overall weighted average of, 15%×60+25%×60+60%×6=27.6 months.

Therefore, the assumption that the overall base P(D) modeled in Section I is representative of approximately a 24-month FAP program is not unreasonable. In order to obtain P(D) for treatments of different durations, 24-month base P(D) can be adjusted backward and forward as described below.

Adjustment backward to 18 months, 12 months and 6 months is based on an adjustment factor that depends on the estimated logistic regression model. For example, adjustments can be defined as, $$\hat{P}(D)_{RDi,MT24} = \hat{P}(D_i=1)$$

and $$\hat{P}(D)_{BAU} = \hat{P}(D_i=1 \mid relief_i=0).$$

Furthermore, define, $$\text{Adj\_backward}_{RDi} = (\hat{P}(D)_{RDi,MT24} - \hat{P}(D)_{BAU})/4$$

Then, $$\hat{P}(D)_{RDi,MT24} = \hat{P}(D)_{BAU} - \text{Adj\_backward}_{RDi}$$

$$\hat{P}(D)_{RDi,MT12} = \hat{P}(D)_{BAU} - 2 \times \text{Adj\_backward}_{RDi}$$

$$\hat{P}(D)_{RDi,MT18} = \hat{P}(D)_{BAU} - 3 \times \text{Adj\_backward}_{RDi}$$

Adjustment forward to 30, 36, 42, 48, 54 and 60 months is also based on an adjustment factor that depends on the estimated logistic regression model. For example, define, $$\text{Adj\_forward}_{RDi} = \frac{\hat{P}(D)RDi, MT24}{\hat{P}(D)RDi, MT18},$$

and, $$\hat{P}(D)_{RDi,MTj} = \hat{P}(D)_{RDi,MT24} \times (\text{Adj\_forward}_{RDi})^{(j-24)/6},$$
if $j = 36, 48, 60$

Probability of Default Stress Factors

Financial Control may forecast significantly higher 2+ and C/O for certain years as compared to other years. Consequently, the probability of default may be higher for some years as opposed to others. In some embodiments, the present invention uses this disparity for forecasting. For example, in some embodiments, the probability of default for both CL and HMS portfolios are stressed by factors of 2.25 and 2.7 respectively. The following point in time percent in 2+ vintage curves for the CL RE portfolio illustrate that the stress factors are warranted. It is clearly evident that 2006 and 2007 vintages have been performing significantly worse than 2004 and 2005 vintages.

PD Adjustment by Market-Product-Customer Risk Segments

Market, product and customer risk segmentation was not available for the FAP-approved population between September '04 and February '05. However, it is possible to use the recent delinquency performance of the BAU population of accounts to project the probability of default curves illustrated in Section I onto the market, product and customer risk segments.

To obtain the delinquency performance of the BAU population, all CL RE accounts that were 1-89 DOD at EOM April 2007 were evaluated at EOM October 2007 to obtain the 90+ ever rate in 6 months by delinquency bucket, market-product-customer risk segment and lien position. 90+ ever rate in 6 months is being used as a proxy for PD, because the time horizon would be too short to observe C/O and LOS information directly. The results are presented in the following tables by lien position. Note that one rate is reported for any two cells where no difference was found.

PD Adjustment by Delinquency Buckets

The relative default performance across delinquency buckets is different between the FAP population and the BAU population (see charts below). Probability of default was modeled using the FAP-approved population while the rho tables were developed based on the general BAU population. To make the rho adjustments applicable, probability of default function based on FAP needs to be adjusted up or down by bucket to reflect the relative performance of the general BAU population.

Therefore, before applying rho tables, the following delinquency based adjustment factors need to be applied. The adjustment factors are obtained by comparing the default performance between the FAP denied customers (as a proxy for the 'do-nothing scenario' of FAP qualified customers) and the regular BAU customers.

More precisely, $$P(D)\_\text{Adj}_{Lien,DLQ,MPC} = P(D)\_\text{FAP}_{Lien,DLQ} * \text{Stress Factor} * \text{DLQ Factor}_{DLQ} * \rho_{Lien,DLQ,MPC}/0.8$$

where, $P(D)\_\text{FAP}_{Lien,DLQ}$ is the projected P(D) based on the FAP P(D) function, Stress Factor is equal to 2.25 for CL and 2.7 for HMS to account for market deterioration, DLQ Factor$_{DLQ}$ is the relative performance factor between regular BAU population and FAP population (as shown in the table of 'Recommended Delinquency Level Adjustment for P(D)), $\rho_{Lien,DLQ,MPC}$ is the rho table developed for HMS & CL portfolio, and 0.8 is the adjustment for incremental P(D) beyond 28 months.

Income relief provided through treatment changes both the probability of default and the timing of default over the life of the loan. Given default, the chance that default happens in month i after treatment follows a negative exponential pattern after the first 27 months In some embodiments of the invention, the following development steps can be used:

1. Let $P(D)_{i,j}$ = Cumulative default rate of the $j^{th}$ treatment within i months, $i \geq 1$, $j \in \text{TreatmentSet}\{0\%$ Relief, 1%~20% Relief, 21%~50% Relief, 50%+Relief$\}$ The following chart shows $P(D)_{i,j}$ of the CL FAP program over 27 months since decision time:

2. Let $\text{Incre\_P}(D)_{i,j}$ = Incremental default rate of the $j^{th}$ treatment during the $i^{th}$ month, the $\text{Incre\_P}(D)_{i,j}$ curves over 27 months can be derived using step 1, i.e. $\text{Incre\_P}(D)_{i,j} = P(D)_{i,j} - P(D)_{i-1,j}$ 3. Using 7-month moving average to smooth each curve to obtain the incremental default rate in month 27, defined as $\text{Incre\_P}(D)_{27,j}$ 4. Assuming lifetime default rate $P(D)_{life,j} = P(D)_{FAP} * \text{Adj\_Factor}_{risk} * \text{Adj\_Factor}_{time}$ and the incremental default rate follows a negative exponential pattern beyond 27 months, the extended incremental default rate curves can be projected as follows:

$$\text{Incre\_P}(D)_{i,j} = \exp(a_j - b_j i)$$

$$\text{s.t.} \text{Incre\_P}(D)_{27,j} = \text{Step 3 result}$$

$$\& \sum_i \text{Incre\_P}(D)_{i,j} = P(D)_{life,j}$$

The following chart illustrates the projected incremental default rate curves up to 48 months, assuming 480 months as remaining term and 125% time adjustment factor 5. Probability of when to default within the lifetime of the loan:
   Let $P(\text{WTD})_{i,j}$ = Probability of default in the $i^{th}$ month for the $j^{th}$ treatment, given that customer defaults. Then, $$P(WTD)_{i,j} = \frac{\text{Incre\_P}(D)_{i,j}}{P(D)_{life,j}}$$

2 + RATE OVER time

FAP point in time actual 2+ rate over 28 months was analyzed for each combination of the decision group and delinquency bucket. The following charts show point in time 2+ rate for all combinations. 3-month moving average was applied to smooth the curves.

Beyond 28 months, 2+ rates were projected using the following steps: Identify the turning point of each curve when the 2+ rate starts to trend downward.

For each curve, use a simple linear regression model to estimate the rate of change in the 2+ rate from the turning point identified in (a) to the end of tracking period. Assuming the same rate of change for the 2+ rate beyond 28 months; i.e., apply the estimated regression equation to project 2+ rate into the future. If the projected 2+ rate drops to near zero at a given point in time, then a fixed 0.05% 2+ rate will be applied to all remaining periods.

The final attrition rate framework is summarized below before presenting the details:

Untreated Attrition Rate:

If the interest rate on the account is below 6%, attrition rate is equal to attrition rate floor. If the interest rate on the account is above 6%, attrition rate is equal to the attrition rate ceiling which is derived based on product, delinquency and lien.

Treated attrition rate was calculated using the following procedures: If the reduced interest rate is lower than 6%, attrition rate is equal to attrition rate floor. If the reduced interest rate is above 6%, then in some embodiments $$\text{Treated Attrition Rate} = \text{attrition ceiling} - \frac{\text{attrition ceiling} - \text{attrition floor}}{\text{current rate} - 6} \times \text{rate reduction}$$

At the end of the modification, attrition rate reverts back to attrition rate ceiling. The details on attrition rate development are presented below. Three iterations have been performed before the final attrition rate framework is developed. First Iteration:

Given the high level of interest rates at the onset of analysis and the delinquency status of target accounts (which implies additional challenge for refinancing), the attrition rate was assumed as 0, i.e. no prepayment, for the first version of model development.

With the extremely slow liquidation pattern observed from the output based on this assumption, attrition was re-developed as outlined below.

Second Iteration:

Attrition assumption for untreated accounts was developed using historical data by risk segments and lien combination. During the development process, charge-off, REO, and purchase/sale activity have been removed from calculation to ensure ratios are strictly attached to prepayment behavior only. The attrition assumption for treated accounts was developed as step 5 below.

|  | HMS | CL |
|---|---|---|
| Step 1 | Develop 14-month attrition performance by lien and risk segments (Observation window: August 2006~October 2007; Source: HSBC CML Segmentation - Delinquency and Liquidation; Completion Date: Nov. 19, 2007; Contact: Lexy Kassan) | Develop 7-month attrition performance by lien and risk segments (Observation window: EOM March 2007~October 2007; Completion Date: Dec. 2, 2007; Contact: Robert Corson) |
| Step 2 | Scale attrition from 14 months to annual 12 months. | Scale attrition from 7 months to annual 12 months. |
| Step 3 | Adjust the attrition rate to 75% to account for anticipated reduction going forward. | Adjust the attrition rate to 90% to account for anticipated reduction going forward and the fact that these observations will be more recent than those used in HMS. |
| Step 4 | Untreated attrition was assumed to be flat. | Untreated attrition was assumed to be flat. |
| Step 5 | Treated attrition was assumed to be start from 0 immediately after modification, and then increase linearly over the next 12 months, until reaching a flat steady-state which is 50% of the untreated attrition based on ARM reset observations | Treated attrition was assumed to be start from 0 immediately after modification, and then increase linearly over the next 12 months, until reaching a flat steady-state which is 50% of the untreated attrition based on ARM reset observations |

Results based on this iteration of attrition assumption suggested that majority of the optimum treatments was 1% rate reduction for 6 months. Reasons were identified as the attrition assumption on treated accounts was over-simplified. As indicated in the table below, for 1% 6-month MOD, the average P(D) improvement for HMS sample is as small as 0.2%. However, the average NPV improvement is $3,917. Comparison of the residual balance over time between BAU treatment and 1% 6-month MOD treatment indicates that MOD treatment has significantly higher residual balance, which translates into larger interest payment that leads to higher NPV.

Given above observations, attrition assumption was revised further to project customers' prepayment behavior that varies based on both rate reduction and relief duration.

Third Iteration: The following changes have been made for the third iteration of attrition assumption development:

Untreated attrition rate: If the interest rate on the account is below 6%, attrition rate is equal to 0. If the interest rate on the account is above 6%, attrition rate is given by the second iteration 'BAU' scenario (constant over time but varies by lien and risk segments). II. Treated attrition rate was calculated using the following procedures: If the reduced interest rate is lower than 6%, attrition rate is equal to 0.

If the reduced interest rate is above 6%, then $$\text{Treated Attrition Rate} = \left(1 - \frac{\text{Rate reduction}}{\text{Current rate} - 6\%}\right) \times BAU \text{ attrition rate}$$

a. At the end of the modification, attrition rate reverts back to BAU level

The 6% floor is selected based on the fact that customers are unlikely to refinance at a new rate that is lower than 6%.

The comparison between CL and HMS attrition rate is in line with general expectations. Associated results based on HMS small sample (~3,000 accounts) was reviewed and results become more reasonable after revising the attrition assumption. The fourth iteration of attrition rate is derived based on COMET segment, Lien position and Delinquency.

The pay off rates was obtained from October, 2007 to December, 2007 COMET eligible population based on COMET segment, Delinquency and Lien position.

Pay off rate shown in the above table is regarded as a ceiling of the attrition rate and is obtained when the rate reduction is 0. This makes sense because usually the higher the interest rate, the higher the attrition rate. The floor of the attrition rate is developed based on experience and is shown in the following table. Attrition rate floor is reached when the new interest rate is 6%.
When the new interest rate is between the current interest rate and 6%, the attrition rate follows a linear relationship with the rate reduction.

$$\text{attrition} = \text{attrition ceiling} - \frac{\text{attrition ceiling} - \text{attrition floor}}{\text{current rate} - 6} \times \text{rate reduction}$$

In summary, the following steps are required for the fourth iteration of attrition assumption development:

Untreated attrition rate: If the interest rate on the account is below 6%, attrition rate is equal to attrition rate floor.

If the interest rate on the account is above 6%, attrition rate is equal to the attrition rate ceiling which is derived based on COMET segment, delinquency and lien.

II. Treated attrition rate was calculated using the following procedures:

a. If the reduced interest rate is lower than 6%, attrition rate is equal to attrition rate floor.

b. If the reduced interest rate is above 6%, then $$\text{Treated Attrition Rate} = \text{attrition ceiling} - \frac{\text{attrition ceiling} - \text{attrition floor}}{\text{current rate} - 6} \times \text{rate reduction}$$

c. At the end of the modification, attrition rate reverts back to attrition rate ceiling.

Economic Scenarios and Loss Given Default

Four forward-looking economic scenarios from CreditForecast.com have been used to project HPI at the major MSA level and estimate loss given default (LGD) for both CL and HMS portfolios.

The four economic scenarios are: Current (expected outcome), slow growth (low forward-looking stress on HPI), recession (medium forward-looking stress on HPI), severe recession (high forward-looking stress on HPI). Given a scenario and a property on book at EOM September '07, the following four steps are involved in computing LGD:

(1) Origination appraisal value is adjusted to the projected REO sales time using quarterly HPI data at the MSA level: (a) Actual HPI data are used to adjust property value to date and (b) HPI forecasts are used to adjust property value from the current date to the estimated REO sales date based on the time horizon specified in the table below:

(2) From previous work done on LGD estimation, regression analysis was used to predict the REO sales price as a simple linear function of the HPI-adjusted origination appraisal value. The equations were estimated at the regional level (A, B, C, C+, D) and are reported below:
Definition of Regions:
  Region A: CA
  Region B: AZ, DE, FL, HI, MD, NJ, NV, VA
  Region C+: AL, CT, GA, ID, IL, MA, MN, ME, MT, NH, NY, OR, PA, RI, WA, WY
  Region C: KS, LA, MO, NC, NE, NM, SC, SD, TN, TX, UT, WI, WV
  Region D: CO, IN, IA, KY, MI, OH, OK (3) HPI-adjusted origination appraisal value is plugged into the appropriate regional regression equation to obtain the predicted REO sales price.

(4) LGD is obtained by using the outstanding balance on the account, predicted REO sales price from step 3 and foreclosure and REO costs (same as NRV calculation).

Mean estimated loss given default is reported below by risk segment for both CL and HMS.

Notes: (1) HMS and CL market-product-customer risk segmentations are not identical, and therefore, the tables below are not directly comparable across CL and HMS.

(2) LGD and loss severity given default are projected to deteriorate severely in high market risk areas as we move from current expected scenario to more stressed scenarios. The deterioration is not projected to be as severe in low market risk areas.

Treatments Offered Under Different Economic Scenarios (Example of Phase I D, ArM Pre-Approvals)

Several economic scenarios were tested to see if the number of loans offered a treatment would change 2 scenarios were tested for P(D) (with stress and without stress). 5 scenarios were tested for LGD based on the outlook provided by www.economy.com. The results below were obtained for a sample of ARM loans but were scaled up to be representative of ARM loans of the HMS portfolio as of EOM December '07.

As is evident from the table above, the treatments get more severe as the economic scenarios deteriorate. As compared to the baseline scenario, about 24.68% of the loans obtain a greater rate reduction under the recession scenario with stressed P (D).

When the above ARMs are restricted to only those loans where the PV of the treatment is higher than $500, the income relief thus provided, more than $100, and the resulting rate higher than 5.25% yet lower then the floor, the following detailed results are obtained. The average income relief, rate reduction and NPV under each scenario also vary. Also, as the economic scenario deteriorates the number of loans to be treated increases. The recession scenario with stressed P (D) was chosen for the purpose of Project COMET. As of right now the 2+, charge-off and PV impact have been estimated based on this scenario. The detailed treatments under each economic scenario are provided in the figures below. As is seen, treatments shift more towards long term modifications as the scenario worsens. Example of volatile markets on treatment (example of phase i e, hms fixed pre-approvals).

The following shows fixed loans from the HMS sample of 93,772 that were input to the COMET methodology. The sample consisted of 52,484 fixed rate loans. It compares California loans to non-California loans for the fixed rate product. As is seen from the tree below a larger proportion of CA $2^{nd}$ liens will be treated through COMET as compared to non-California loans. This difference is predominantly due to the higher LGD of CA 2nds. Detailed treatment combination does not vary a whole lot between the two segments, although CA 2nds are provided a relatively lower rate reduction.

The response of the probability of default to variations in income relief was evaluated within a logistic regression framework by using historical data from the Foreclosure Avoidance Program (FAP).

Product Risk

Traditional modeling in the Retail portfolio has revolved around customer risk, although alarming rises in delinquency have warranted modeling product risk. In general similar product characteristics tend to exhibit similar delinquency trends over time. Decision tree analysis, therefore, can be used to identify groups of products with similar delinquency trends. Treatments could then be specialized based on the risk level of each group.

Multiple methodologies were utilized for the development of product risk. The first, looked at the 2+ (60+ days past due) ever rate in 6 months from origination while the other looked at 2+ at the end of a 6 month window (March to August '07).

The second methodology was chosen as it is expected to capture the most recent rises in delinquency. Also, internal CGS2 scores were tested as a predictor, although it was decided later that CGS2 is a predictor of customer behavior and should be excluded from predicting product risk.

It is proposed that the model be revisited every 3 months to ensure that recently originated products are being captured. Every subsequent phase of the model will require Two methodologies were utilized. Methodology 1:

Retail RE portfolio origination characteristics were obtained from internal origination tables and contain all accounts on accounts receivables systems. Metric: 2+ ever in 6 months since origination. Historical data can be used during the modeling process.

For developing the segmentation models, the bad definition (2+ DOD) was used as the dependent variable. The independent variables were Origination year, Original LTV (Loan to value ratio), Lien position, Loan type (Fixed or Adjustable rate mortgage), SVI (Substantially verified income), and SPP (Secured plus loans). The order of predictive variables was determined by the level of separation provided by that particular variable e.g. the Vintage year provides the best separation of accounts into different groups with varying performance and hence appears at the top of the variable order. The rest of variables were selected based on the predictive power provided while maintaining the linear relationship between the dependent and independent variables.

The datasets were loaded into Knowledge Studio™ 4.2.0. It helps in exploring relationships between different variables visually by creating splits that are displayed in a tree-like fashion. The decision trees were formulated using CHAD (Chi-squared Automatic Interaction Detector) analysis. This name derives from the basic algorithm that is used to construct (non-binary) trees, which for classification problems (when the dependent variable is categorical in nature) relies on the Chi-square test to determine the best next split at each step; for regression type problems (continuous dependent variable) the program will actually compute F-tests.

Methodology 1: 2+ ever in 6 months from origination. A quick examination of the results shows us that the overall 2+ ever rate was 0.57% with a sample size of 430,731 accounts. Segments with a 2+ ever rate greater than 0.57% were considered as high risk. The K-S statistic was used to gauge the strength of the decision tree and was found to be 26.36.

In some embodiments, the accounts from, for example, 2006 vintage year and non SPP (non secured plus) had a higher 2+ ever rate. Accounts with higher original LTV ratio (greater than 90%) also had a higher 2+ ever rate.

CGS2 was not used for this segmentation as it was considered as customer risk characteristic. However using CGS2 below, predicts that customers with a low CGS2 (less than 90) who were originated with a high original LTV ratio (greater than 90%) fall under the highest risk category.

The overall 2+ in 6 month rate was 2.03%, and the highest risk category has a 2+ in 6 month rate of 5.93%. The K-S statistic for this tree was 26.00.

The above methodology was disregarded as it did not include originations before 2004 (25% of the book as of August '07). It was also a hypothesis that this methodology would not capture any new delinquency in the Retail book, as it only measured 2+ ever in 6 months from origination.

Methodology 2: 2+from March-August 2007. Using CGS2 in segmentation proved to be powerful. Customers with a low CGS2 (less than 90) originated with a high original LTV ratio (greater than 90%) fall under the highest risk category. CGS2 seems to be a good predictor of risk. However, since CGS2 is a predictor of customer risk, it was decided to build the tree without CGS2.

In the absence of CGS2, the product risk tree has a much lower KS, although it does capture risky Retail products. This methodology was decided to be the most suitable as it would eliminate chances of any bias between customer and product risk definitions. The tree was built with 80% of the March sample.

In sample and out of sample validation of the created risk segments shows stability in volume and separation in bad rates. In sample validation is carried out for the March sample. 80% of the sample was used to build the segmentation. Validation was carried out on the rest of the 20%.

Further details are now given of developing and incorporating customer risk into the COMET Model. Customer risk segmentation has been extensively used in developing early default dialer strategies. In general, customers with similar characteristics tend to exhibit similar delinquency trends over time. By segmenting customers into different risk tiers, work effort can be aligned to focus resources on high risk customers. CML Secured utilizes two servicing platforms. Customer risk segmentation models exist on the CII platform and are monitored monthly for volume and performance stability. Also, a similar segmentation model has been built for accounts housed on the Fidelity platform.

As a data mining and predictive modeling tool, Knowledge Studio software is used for this segmentation. By using decision tree analysis and CHAID (Chi-square Automatic Interactive Detector) algorithm, groups of customers with similar delinquency behavior are identified. Treatments are then identified based on the risk level of each group.

The proposed customer risk strategy affects only the Consumer Lending secured portfolio housed on the MortgageSery servicing platform. The already existing customer risk segmentation will be utilized for the CII and acquisitions book. Future efforts can look at developing long term scores for all portfolios.

This section will provide more detailed description about the current strategy and the methodology and results in developing the proposed strategy. The current strategy segments customers into three risk tiers, with Tier 1 the lowest risk and Tier 3 the highest risk. Risk segmentation for different product (RE FIXED, RE VARIABLE and PHL) was developed separately.

Each tier is assigned a unique collection indicator (COLLID). Based on which state the customer is in, the grace period is assigned (either 10 or 15.) Tier 1 accounts are called 4 days after the grace period; Tier 2 accounts are called 2 days after the grace period and Tier 3 accounts are called right after the grace period.

The proposed strategy was developed using the same methodology as the current strategy. The data used was CASM daily data with accounts cycling into 1 DOD between Jun. 1, 2007 and Jun. 30, 2007. Each account was given one full cycle at the end of which its performance was evaluated. Hence the accounts cycling 1 DOD in June were checked in the month of July to see if they rolled forward or not Segmentation was performed only on 'P' status accounts as majority of the population is in 'P' status (~99%). Accounts cycling 1 DOD in June were used in the development sample.

Knowledge studio was used to develop a segmentation tree. In Knowledge Studio, one variable is needed to generate splits for the decision tree. The variable was "GOODBAD" for RE FIXED and RE VARIABLE, and "ROLL" for PHL. The definition of "GOODBAD" is as following: If a 1 DOD account rolls into 30's bucket one cycle (30 days) later, or being charged off, or goes to REO/Foreclosure, then it is regarded as "Bad". If the account is in Bankruptcy or Pre-foreclosure, insurance, dispute/fraud and has not rolled to 30's bucket, then it is defined as 'Indeterminate'; otherwise it is defined as "Good." While for PHL, variable "ROLL" was defined to indicate whether a 1 DOD accounts rolls to 30s at the beginning of the next cycle.

In sample and out of sample validation was conducted, the results of which are shown in the following sections. Model Development. MQS (Modeling and Quantitative Solutions) team built a scorecard for RE FIXED and PHL respectively to predict the forward roll of all 1-29 DOD accounts. This score was used in the segmentation development and was proven to be very predictive of the X's to 30's roll.

All 1 DOD accounts with their characteristics (>20 variables) and performance (Rolled/Not-rolled or Good/Bad) were segmented using Decision Tree Modeling (CHAID algorithm) in Knowledge Studio software. The accounts were then split into multiple groups based on characteristics that are predictive of roll behavior. This segmentation resulted in 5 risk tiers defined by the cuts shown in table 1. For example, if a group of customers has an average roll rate of 3.5%, then this group of customers is assigned a Tier 1.

TABLE 1

| Tier Definition | |
| --- | --- |
| Tier | Range |
| Tier 1 | 0%-6% |
| Tier 2 | 6%-12% |
| Tier 3 | 12%-24% |
| Tier 4 | 24%-35% |
| Tier 5 | 35%+ |

The segmentation resulted in a set of rules. Accounts cycling will be run through these rules. This would classify accounts into 5 risk tiers depending on their characteristics. Treatments and call routing will be decided based on the tiers. All accounts in 30's bucket or higher will be defaulted to Tier 6.

In sample and out of sample validation shows stability in volume and performance for all products. In sample validation was carried out for June's population. A 50% in sample validation for RE Fixed shows stability in results as shown in the charts below.

The three strategies were tested out of sample based on April and May data. As shown above, the volumes in each tier are stable, and the roll rates are consistent across months.

Figure 12:
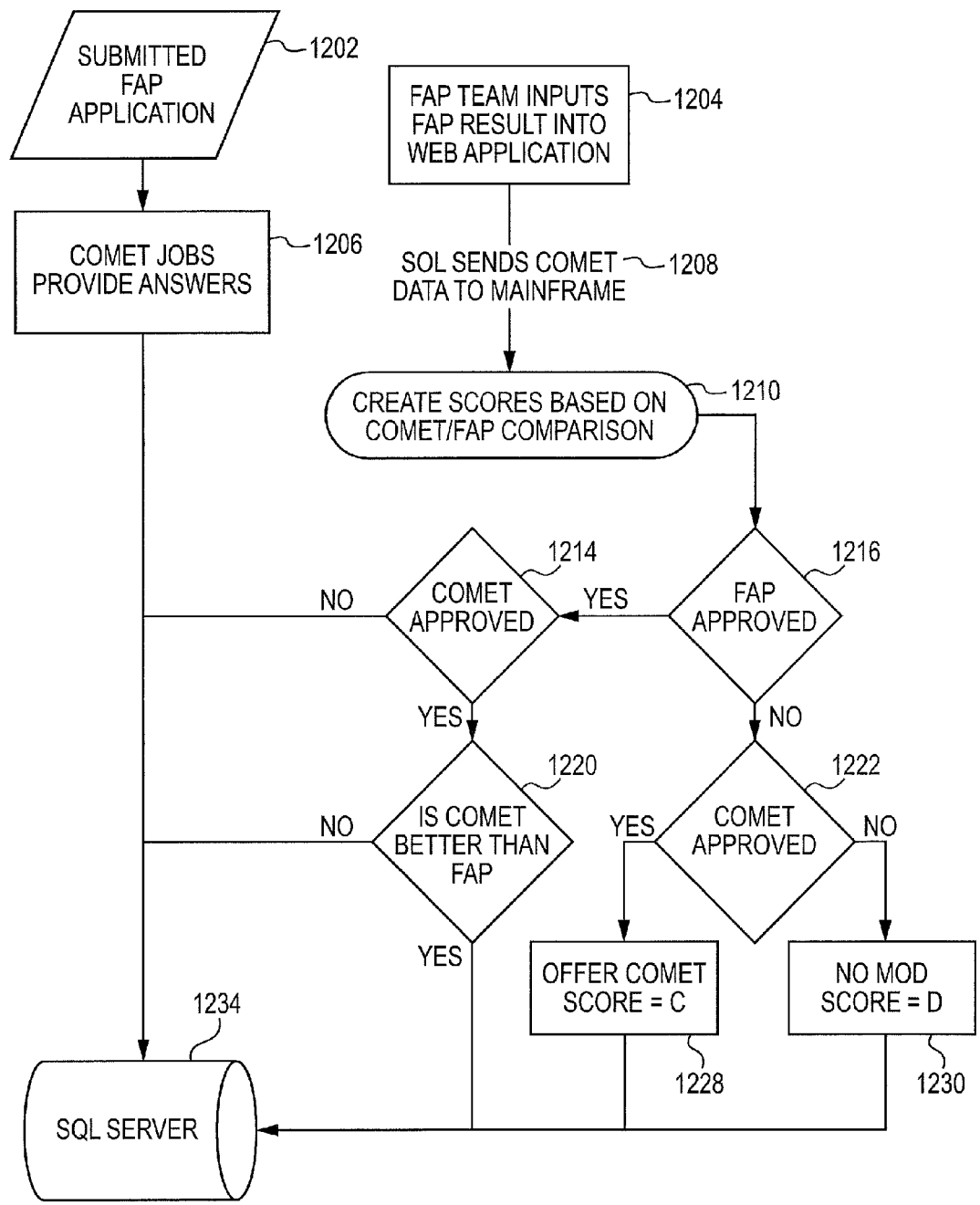
FIG. 12 is a flow diagram showing how a decision can be made between multiple loan modification programs when providing a loan modification to a customer.

Treatments for each tier were chosen based on the daily liquidation charts (Refer to FIG. 12 in the Appendix). The treatments for each tier are shown in Table 2.

TABLE 2

| Treatment for each tier * | | |
| --- | --- | --- |
| Tier | Hold Period | Penetration Rate |
| Tier 1 | 18 | 200% |
| Tier 2 | 11 | 200% |
| Tier 3 | 11 | 300% |
| Tier 4 | 6 | 400% |
| Tier 5 | 6 | 500% |
| Tier 6 | 0 | 500% |

Risks/Operational Considerations. Tier 2-Tier 6 accounts are assigned a hold period less than 15 days, which means that some of these customers will receive phone calls within their grace period. Calling customers within the grace period may raise customer complains and affect the brand of our company.

Expected Impact. The proposed strategy captures the behavior of customers in early default more comprehensively, hence will be more accurate in predicting the customer behavior. Compared with the current strategy, the proposed strategy increases the number of accounts that are on hold and reduces the number of accounts that go to the dialer. The resources thus created can be utilized to focus attention on accounts that pose a higher risk to the business.

A test was conducted to see how the new strategy will impact dialer operations. In this test, the front-end population was put through two sets of strategies (existent and proposed). The accounts were assigned to different dialer lists to see how the volume of accounts to be worked will change once the proposed strategy is implemented.

The departments that go to the dialer are IMPACT and NON-IMPACT department. The total number of accounts that goes to IMPACT, NON-IMPACT, DONTCALL and RBLAST are exactly the same for two strategies. The volumes only switch within these 4 departments. Test shows that the new strategy increases the number of accounts in the DONTCALL department and reduces the number of accounts that go to the dialer.

We can see that the number of accounts in DONTCALL department is always higher in the proposed strategy than in the current strategy, while the volume the goes to the dialer (IMPACT+NONIMPACT) is smaller in the proposed strategy. Therefore we know that the proposed strategy will release resources by putting more accounts on hold. The freed up resource will be utilized for increased intensity on high risk accounts.

Testing Considerations. Implementation of a test is being considered, although unavailability of the short-term solution (current strategy) in TRIAD poses challenges. The percentage of Champion/Challenger should be well considered. The possibility of a test needs to be discussed is dependent upon the approval of Operations and the Management team.

Volume and Peformance of 3 risk Levels. Different modeling approaches were utilized to establish market and product risk for the Retail secured portfolio. Utilizing all the three levers the volume and performance of all possible combinations was considered. Customer risk appears to be the most predictive of probability of default.

Figure 5:
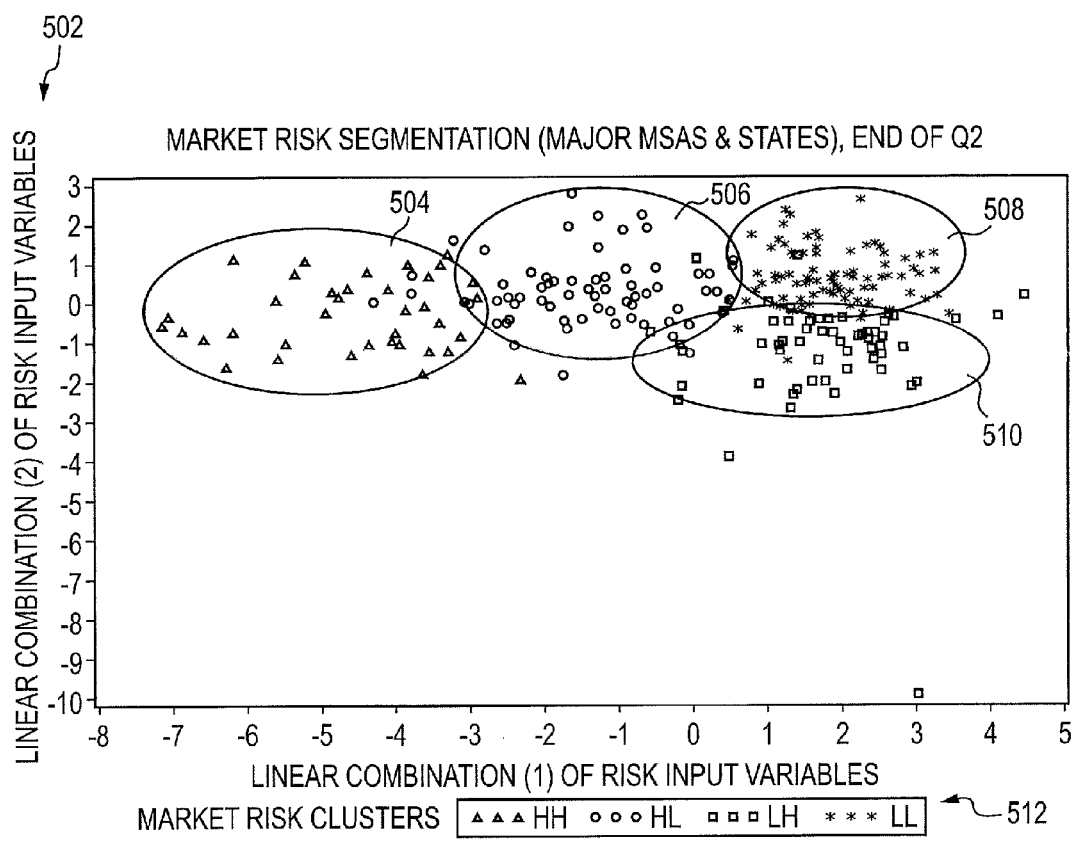
FIG. 5 is a diagram showing the use of market risk segmentation with the COMET model.

FIG. 5 is a diagram showing the use of market risk segmentation with the COMET model. To determine the market risk component of the probability of default, the volatility of different markets can be considered. FIG. 5 visually illustrates that market risk clusters are well separated. Good separation among risk clusters indicates that input variables project high explanatory power towards identifying clusters of MSAs that are similar in terms of the underlying economic drivers of delinquency.

Modeling market risk, along with product risk, customer risk and loss given default, is essential in developing a comprehensive risk segmentation strategy. In general, markets with similar economic characteristics tend to exhibit similar delinquency trends over time. Clustering analysis, therefore, can be used to identify groups of markets with similar underlying economic drivers of delinquency. Treatments could then be specialized based on the risk level of each group.

Market risk methodology presented here is forward-looking. Markets are classified into risk segments based on the relative projected changes in delinquency performance from recent levels and not the relative projected levels of delinquency performance in the future. For example, if Ohio is classified as having lower market risk than California, then that is because the delinquency performance in California is expected to deteriorate more than that in Ohio going forward in time and not because California has a higher projected delinquency level in the future relative to Ohio.

Proposed Usage and Updates

Market risk results presented here will be combined with product risk and customer risk segmentation results (developed separately) to build a comprehensive risk segmentation strategy for the Retail RE portfolio. Treatments could then be specialized based on the combined strategy.

Customer and product risk segmentations that will accompany the market risk segmentation have high explanatory power at explaining differences in delinquency performance across markets at a given point in time but low explanatory power in differentiating among markets that experience changing delinquency performance across time. Consequently, since the market risk methodology captures changes in delinquency performance across time (as opposed to delinquency levels), it is a valuable component of a comprehensive segmentation strategy.

Results will be updated quarterly as the required economic data are officially released and the external forecasts that are based on the economic data are updated. The performance of market risk segments will be evaluated quarterly by monitoring portfolio delinquency trends across time. Refinements to the proposed methodology will be considered with each quarterly release.

Market risk is defined at the MSA-level as the correlation of Retail RE portfolio delinquency performance with housing affordability and changes in housing prices, real disposable income per capita, unemployment rate and average LTV ratio.

Retail RE portfolio is combined with economic variables and their forecasts based on Moody's CreditForecast.com baseline scenario as of 2007.Q2. All variables defined below are used as input variables in the clustering analysis that is discussed in the next section. These variables were chosen from among a set of available variables based on their power in identifying risk clusters.

Data is compiled at the MSA level. 29 metropolitan divisions (population>2.5 MM), 171 metropolitan areas (2.5 MM>population>100K) and 49 non-metropolitan state territories were clustered into four forward-looking market risk segments: HH (severe risk), HL (high risk), LH (elevated risk), and LL (general risk).

Delinquency rates are computed monthly from December 2006 to August 2007. Delinquency rate for a given month j is defined as the EOM total dollar volume of 60-89, 90-119, 120-149 and 150-179 DOD delinquency buckets as a percent of the loan account balance. The usual 2+ delinquency metric was not used because 180+DOD buckets include significant foreclosure volume. Since foreclosure completion timelines vary significantly among states, the usual 2+ delinquency metric would be biased when comparing changes in delinquency rates for different geographic regions.

The delinquency performance variable (DELQ) is defined at the MSA level as the difference in average monthly delinquency rates between periods of December 2006-May 2007 and June 2007-August 2007. Monthly averaging substantially reduces any effect that seasonality may have on clustering results. 2007.Q2 market risk results were produced in September 2007, because the external data for the economic input variables are released with one quarter lag. Consequently, when this report was produced in September 2007, delinquency data were available up to EOM August 2007.

Then, for a given MSA m, DELQ at 2007.Q2 is given by, $$DELQ_m^{2007.Q2} = \frac{\sum_{j=Jun2007}^{Aug2007} DR_{m,j}}{3} - \frac{\sum_{j=Dec2006}^{May2007} DR_{m,j}}{6},$$

where, $$DR_{m,j} = \frac{\text{Balance of } 60-179 \text{ } DOD \text{ accounts at end of month } j \text{ in MSA } m}{\text{Loan account balance end of month } j \text{ in MSA } m}.$$

OFHEO housing price index (available quarterly) is used to define a variable (DHPI) that captures the actual housing price peaks over the past four quarters (if any) and computes percent expected change from that price peak to the projected one-year ahead price. Especially in cases of price-depreciating markets, the timing of price extrema varies by MSA. DHPI captures this variation in the timing of price extrema and yields improved segmentation among market risk clusters. Let $_mHPI_q^k$ be the forecast at time k for quarter q of the HPI index in MSA m. Also, let $HPI_m^k$ represent the actual HPI index in quarter k in MSA m. Then, for a given MSA m, DHPI at 2007.Q2 is given by, $$DHPI_m^{2007.Q2} = \frac{_mHPI_{2008.Q3}^{2007.Q2} - \underset{\{k=2006.Q3-2007.Q3\}}{\text{Max}} HPI_m^k}{\underset{\{k=2006.Q3-2007.Q3\}}{\text{Max}} HPI_m^k}.$$

National Association of Realtors (NAR) affordability index (AFFD) is used to capture variations in housing affordability among markets. This index captures whether a household with median income has adequate income to qualify for a conventional mortgage on a median-priced home. In markets where historical housing price appreciation trend has been steeper than the growth trend of real personal incomes (overheated markets), affordability tends to be low and vice versa. In price depreciating markets with low affordability, delinquency performance is expected to be relatively poor.

Consequently, AFFD yields improved segmentation. In notation, for a given MSA m, $AFFD_m^{2007.Q2}$=NAR affordacility index in 2007.Q3− 100, where 100 is subtracted from the affordability index to enable easier interpretation. As a result, if AFFD for a given MSA is less than zero, then a household in that MSA with median income does not have adequate income to qualify for a conventional mortgage on a median-priced home; and vice versa for AFFD>0

Projected changes in labor market conditions are captured at the MSA level by defining a variable (UNEM) based on the unemployment rate announced by the Bureau of Labor Statistics (downloadable from CreditForecast.com.) UNEM is defined as the difference between the average projected quarterly unemployment rate over 2007.Q3-2008.Q3 and the average actual quarterly unemployment rate over 2006.Q2-2007.Q2. Monthly averaging substantially reduces any effect that seasonality may have on clustering results. Let $_mUR_q^k$ be the forecast at time k for quarter q of the unemployment rate in MSA m. Also, let $UR_m^k$ represent the actual unemployment rate in quarter k in MSA m. Then, $$UNEM_m^{2007.Q2} = \frac{\sum_{q=2007.Q3}^{208.Q3} {}_mUR_q^{2007.Q2}}{5} - \frac{\sum_{k=2006.Q2}^{2007.Q2} UR_m^k}{5}$$

One-year ahead projected change in seasonally adjusted annualized disposable incomes per capita (DINC) is captured at the MSA level as another economic indicator to be used as an input variable in the analysis. Let $_mINCPC_q^k$ be the forecast at time k for quarter q of the seasonally adjusted annualized disposable income per capita in MSA m. Then, DINC at 2007.Q2 for MSA m is given by, $$DINC_m^{2007.Q2} = \frac{{}_mINCPC_{2008.Q3}^{2007.Q2} - {}_mINCPC_{2007.Q3}^{2007.Q2}}{{}_mINCPC_{2007.Q3}^{2007.Q2}}$$

Finally, MSA-level average LTV ratio is used to define another input variable: For a given MSA, LTVR is defined as the percent change from the average quarterly LTV ratio over 2006.Q2-2007.Q2 to the average quarterly projected LTV ratio over 2007.Q3-2008.Q3. Let $_mLTV_q^k$ be the forecast at time k for quarter q of the average LTV ratio in MSA m. Also, let $LTV_m^k$ represent the actual average LTV ratio in quarter k in MSA m. Then, LTVR at 2007.Q2 in MSA m is given by, $$LTVR_m^{2007.Q2} = \frac{\left[\sum_{q=2007.Q3}^{2008.Q3} {}_mLTV_q^{2007.Q2}/5\right] - \left[\sum_{k=2006.Q2}^{2007.Q2} LTV_m^k/5\right]}{\sum_{k=2006.Q2}^{2007.Q2} LTV_m^{=k}/5}.$$

Methodology and results. MacQueen's K-means clustering algorithm was used to identify disjoint sets of MSAs based on the input variables defined above. MacQueen, J. B. (1967), "Some Methods for Classification and Analysis of Multivariate Observations," *Proceedings of the Fifth Berkeley Symposium on Mathematical Statistics and Probability*, 1, 281-297. Clustering is such that the MSAs in each cluster are more similar to each other than to MSAs in other clusters in term's of the underlying economic drivers of delinquency (input variables). K-means algorithm in SAS software combines an effective method for finding initial clusters with a standard iterative algorithm for minimizing the sum of squared distances from the cluster means. All input variables were standardized prior to estimating clusters.

Canonical discriminant analysis was used to project the multidimensional space of the clusters onto two dimensions to enable a visual assessment of cluster separation. Canonical discriminant analysis derives linear combinations of the input variables such that between-cluster covariance matrix is maximized. The linear combinations can then be plotted and separation visually inspected.

Four market risk segments are: HH (severe risk), HL (high risk), LH (elevated risk), and LL (general risk). Assignment of these risk labels to the four clusters determined by the K-means algorithm was based on rank-ordering (highest-to-lowest) of the delinquency performance deterioration in basis points from EOM March 2007 to EOM August 2007.

Certain MSA's, such as, California, Nevada, Arizona, Florida, VA-WV-MD-DC metropolitan division, and NY-NJ metropolitan division pose severe (HH) forward looking market risk. Furthermore, many other states and MSAs are found to pose high (HL) forward-looking market risk.

Modeling market risk, along with product risk, customer risk and loss given default, is essential in developing a comprehensive risk segmentation strategy. In general, markets with similar economic characteristics tend to exhibit similar delinquency trends over time. Clustering analysis, therefore, can be used to identify groups of markets with similar underlying economic drivers of delinquency. Treatments could then be specialized based on the risk level of each group.

Markets are classified into risk segments based on the relative projected changes in delinquency performance from recent levels and not the relative projected levels of delinquency performance in the future. For example, if Ohio is classified as having lower market risk than California, then that is because the delinquency performance in California is expected to deteriorate more than that in Ohio going forward in time and not because California has a higher projected delinquency level in the future relative to Ohio.

Market risk results presented here will be combined with product risk and customer risk segmentation results to generate a comprehensive risk segmentation strategy. Customer and product risk segmentations that will accompany the market risk segmentation have high explanatory power at explaining differences in delinquency performance across markets at a given point in time but low explanatory power in differentiating among markets that experience changing delinquency performance across time. Consequently, since the market risk methodology captures changes in delinquency performance across time (as opposed to delinquency levels), it is a valuable component of a comprehensive segmentation strategy.

Results can be updated as the required economic data are officially released and the external forecasts that are based on the economic data are updated.

Market risk is defined at the MSA-level as the correlation of Retail RE portfolio delinquency performance with housing affordability and changes in housing prices, real disposable income per capita, unemployment rate and average LTV ratio.

Data is compiled at the MSA level. This can include metropolitan divisions (population>2.5 MM), metropolitan areas (2.5 MM>population>100K), and non-metropolitan state territories. These MSA level can then be clustered into four forward-looking market risk segments: HH (severe risk), HL (high risk), LH (elevated risk), and LL (general risk).

Delinquency rate for a given month j is defined as the EOM total dollar volume of 60-89, 90-119, 120-149 and 150-179 DOD delinquency buckets as a percent of the loan account balance.

National Association of Realtors (NAR) affordability index (AFFD) is used to capture variations in housing affordability among markets. This index captures whether a household with median income has adequate income to qualify for a conventional mortgage on a median-priced home. In markets where historical housing price appreciation trend has been steeper than the growth trend of real personal incomes (overheated markets), affordability tends to be low and vice versa. In price depreciating markets with low affordability, delinquency performance is expected to be relatively poor. Consequently, AFFD yields improved segmentation. In notation, for a given MSA m, where 100 is subtracted from the affordability index to enable easier interpretation.

Projected changes in labor market conditions are captured at the MSA level by defining a variable (UNEM) based on the unemployment rate announced by the Bureau of Labor Statistics (downloadable from CreditForecast.com.) UNEM is defined as the difference between the average projected quarterly unemployment rate over 2007.Q3-2008.Q3 and the average actual quarterly unemployment rate over 2006.Q2-2007.Q2. Let be the forecast at time k for quarter q of the unemployment rate in MSA m. Also, let represent the actual unemployment rate in quarter k in MSA m. Then, One-year ahead projected change in seasonally adjusted annualized disposable incomes per capita (DINC) is captured at the MSA level as another economic indicator to be used as an input variable in the analysis. Let be the forecast at time k for quarter q of the seasonally adjusted annualized disposable income per capita in MSA m. Then, DINC at 2007.Q2 for MSA m is given by, Finally, MSA-level average LTV ratio is used to define another input variable: For a given MSA, LTVR is defined as the percent change from the average quarterly LTV ratio over 2006.Q2-2007.Q2 to the average quarterly projected LTV ratio over 2007.Q3-2008.Q3. Let be the forecast at time k for quarter q of the average LTV ratio in MSA m. Also, let represent the actual average LTV ratio in quarter k in MSA m. Then, LTVR at 2007.Q2 in MSA m is given by, MacQueen's K-means clustering algorithm was used to identify disjoint sets of MSAs based on the input variables defined above. Clustering is such that the MSAs in each cluster are more similar to each other than to MSAs in other clusters in terms of the underlying economic drivers of delinquency (input variables). K-means algorithm in SAS software combines an effective method for finding initial clusters with a standard iterative algorithm for minimizing the sum of squared distances from the cluster means. All input variables were standardized prior to estimating clusters.

Canonical discriminant analysis was used to project the multidimensional space of the clusters onto two dimensions to enable a visual assessment of cluster separation. Canonical discriminant analysis derives linear combinations of the input variables such that between-cluster covariance matrix is maximized. The linear combinations can then be plotted and separation visually inspected.

Four market risk segments are: HH (severe risk), HL (high risk), LH (elevated risk), and LL (general risk). Assignment of these risk labels to the four clusters determined by the K-means algorithm was based on rank-ordering (highest-to-lowest) of the delinquency performance deterioration in basis points from EOM March 2007 to EOM August 2007.

Figure 6:
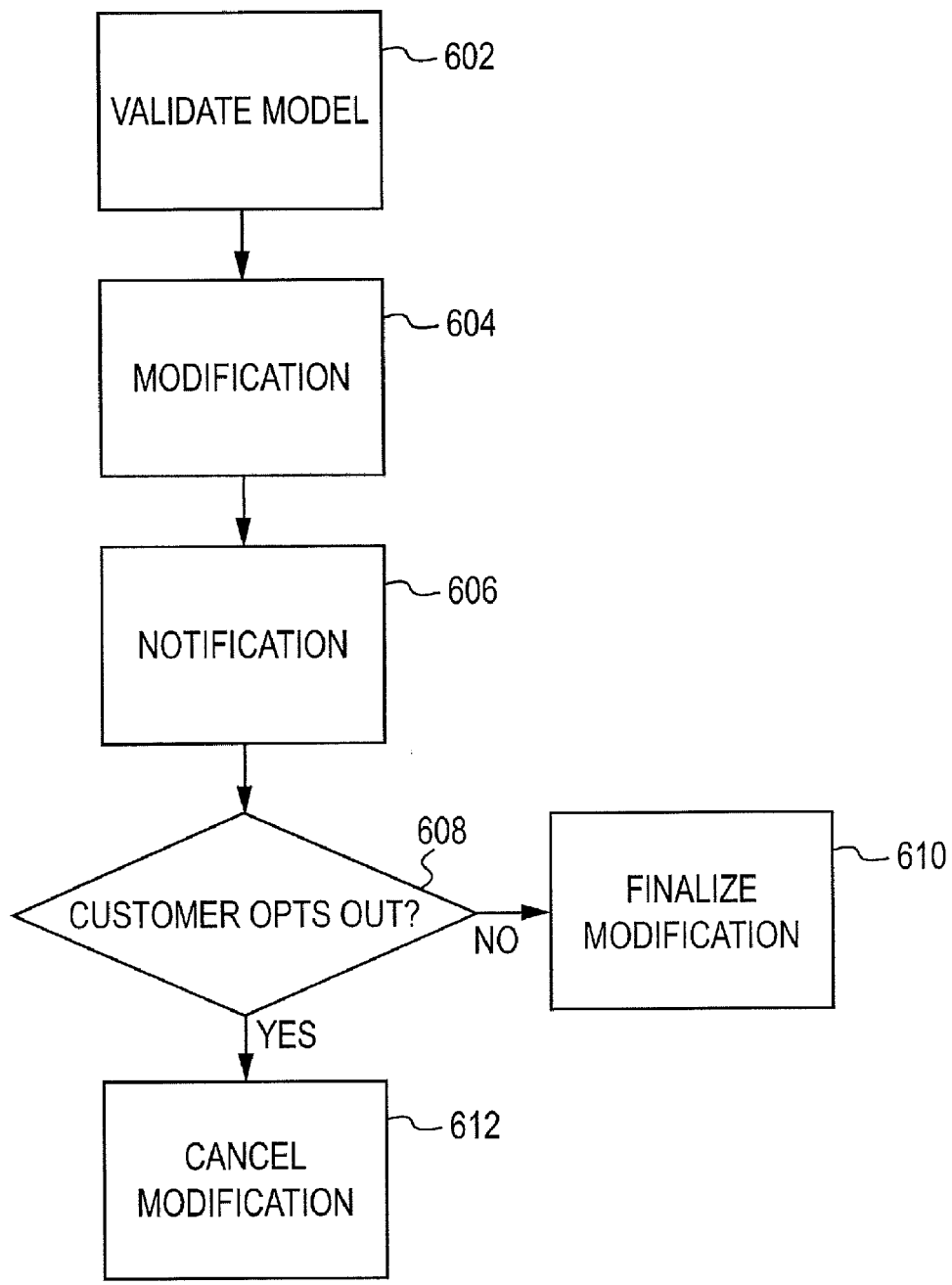
FIG. 6 is a flow diagram showing the overall proactive COMET loan modification process.

FIG. 6 is a flow diagram showing the overall proactive COMET loan modification process. The method includes validating a model 602, performing a modification 604, and automatically notifying a customer 606, with the option to opt-out 608-612.

At step 602 the COMET model can be validated. This includes comparing the output to historical performance of loan modification including from relates programs like FAP. This helps validates the assumptions of the financial model. At step 604, a modification is performed automatically by the system after analyzing all the modification possibilities. Alternatively, this can be done by a customer service representative or other lender agent.

At step 606, the customer is notified of the loan modification (e.g. the rate, term, and/or principal) by one or more methods as described above. At step 608, there is a check to see is a customer has opted out of the loan modification. This opt-out period can be some limited about of time, for example, 30 days. If the customer has not opted-out, then at step 610 the loan modification is finalized. Otherwise, at steps 612 the loan modification is cancelled, and the customer continues to make normal payments under their current mortgage.

Additionally, the customer may enter a probationary period, where they must comply with the terms of the loan modification for a certain period of time to make the loan modification permanent, for example, 3 months. If they comply with the terms of the loan modification they are mailed a document with the loan terms for their signature.

If they do not comply with the modified terms, the loan modification is cancelled, and they are reverted back to their original terms. Alternatively, their loan can be considered for a foreclosure assistance program, or an additional loan modification.

Figure 7:
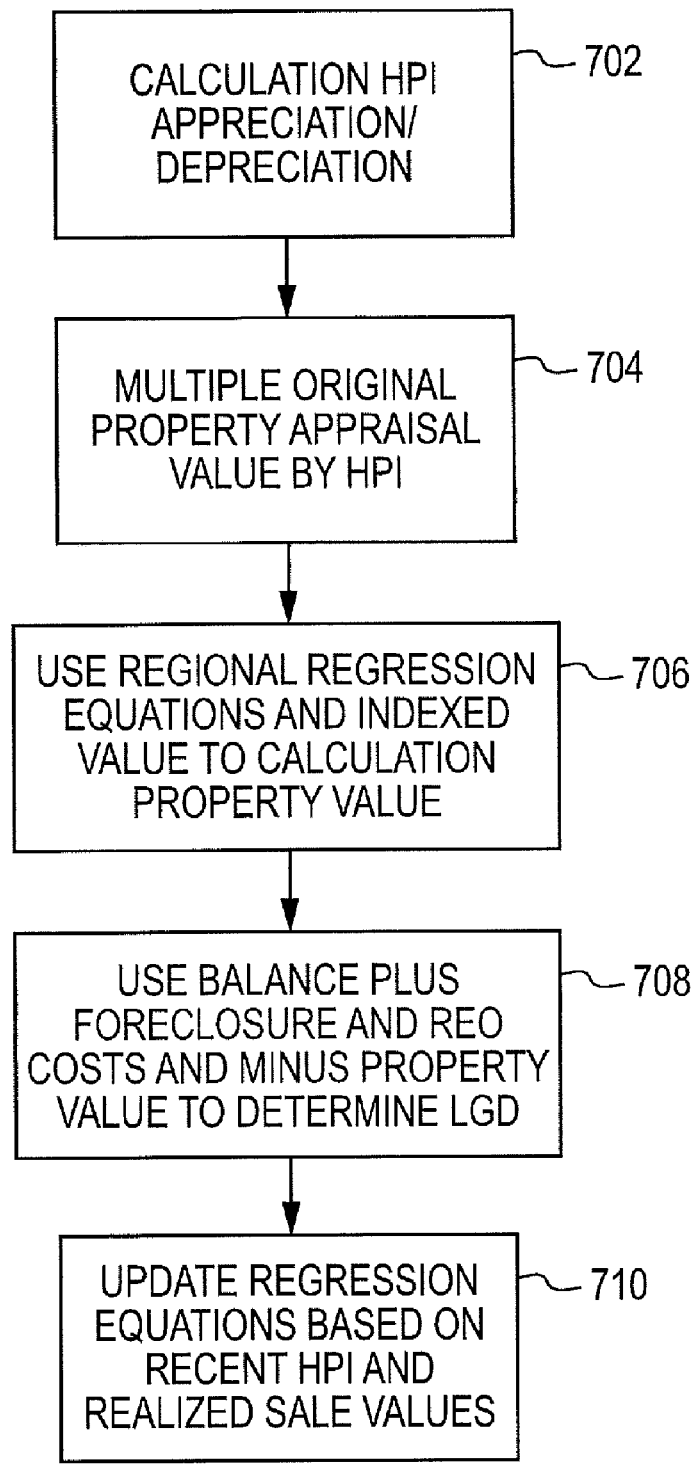
FIG. 7 is a flow diagram showing the calculation of loss given default (LGD) of the overall COMET loan modification process.

FIG. 7 is a flow diagram showing the calculation of loss given default (LGD) part of the overall COMET loan modification process. At step 702, the Housing price index is collected, for example, from a market information provider. At step 704, the original property price is multiplied by the HPI. This gives a more accurate estimate of the property value at foreclosure, which in turn allows a more accurate loss to be determined if a borrower were to default. At step 706, regional equation (described below) are used to adjust the indexed value for regional differences, further improving the accuracy of the estimate. At step 708, the balance of the mortgage, plus foreclosure and REO costs, minus the property value, is used to determine the LGD. At step 710, the regression equations and HPI are adjusted using recent sales values. This improves accuracy for later determinations.

Loss Given Default (LGD) is an important metric in determining risk levels for early default accounts. If LGD is high, meaning the account potential loss amount is high, then extra collection effort is warranted. For first-lien accounts, LGD is estimated by assuming forfeiting the account balance but repossessing the property, and hence is calculated by balance minus property Net Realizable Value (NRV), which is projected property sales price minus various foreclosure and REO costs. The difficulty of estimating LGD lies in that, at the time of early delinquency, up-to-date Broker Price Opinion (BPO) or appraisal information is not available, and is not cost-efficient to purchase in large volume. A regression equation based methodology is therefore proposed herein to estimate property market value using its value at loan origination and indexed by House Price Index (HPI) appreciation/depreciation ever since.

In some embodiments of the invention, the following method is used to determine LGD: Step 1: For default accounts, calculate the HPI appreciation/depreciation rate since origination. Step 2: Multiply property original appraisal value (obtained at origination) by HPI appreciation/depreciation rate from Step 1 to get the indexed value. Step 3: Use the regression equations derived for each region and the indexed value from Step 2 as input to calculate the property value. Step 4: Use balance plus foreclosure and REO costs (same as NRV calculation) and minus the property value obtained at Step 3 as LGD. Step 5: Update regression equations quarterly based on most recent HPI values and realized REO sales prices.

Risks and operational considerations. There is inherent and unavoidable bias in the LGD assessment that arises from the fact that all reflected losses is on properties that made it all the way through to the REO end state. There is no good way to understand the degree of this bias or remove the bias.

The above approach is used only as a means to estimate property value at early default stage, and by no means will it replace foreclosure BPO in foreclosure and loss mitigation decision processes. Foreclosure bidding strategies will still be based on BPO values. LGD can also be used as a tool to "pre-screen" accounts that require attention or BPO purchase if necessary. All 2nd liens are assumed to be at a 100% loss using this methodology. Operational experience endorses upon this assumption.

Testing considerations and performance tracking. As more AVM values are obtained, the $R^2$ values obtained from equations using HPI indexed values as input will be compared with the ones from AVM equations. As long as the proposed method yields higher $R^2$ values, it should be applied.

The equations will be updated quarterly using updated sales prices and HPI values. $R^2$ values and parameters for all regions will be tracked to watch out for any deterioration of the method. In particular, monthly review of regression will be performed on historically sparsely populated states such as CA.

Figure 8:
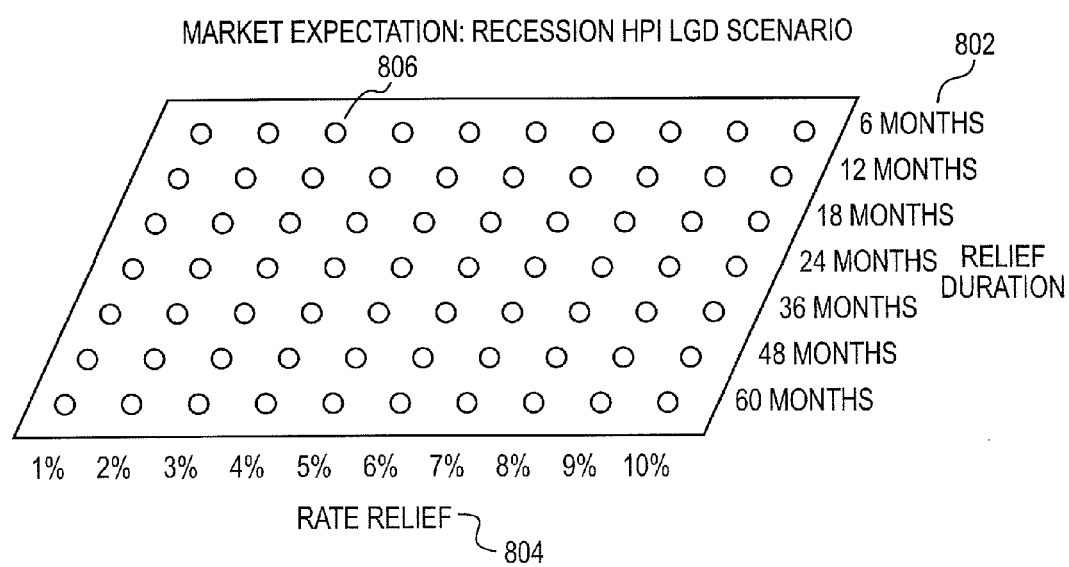
FIG. 8 is a diagram showing how the COMET model is applied to multiple scenarios to determine how to modify a loan.

FIG. 8 is a diagram showing how the COMET model is applied to multiple scenarios to determine how to modify a loan. The diagram has on one axis the amount of rate relief 804 to grant a customer, and on the other axis the duration of the relief 802. These are just examples. Each of these combinations of rate relief and relief duration is analyze using the COMET model, and the combination that results in the most value is selected. In some embodiments of the invention, principal reductions can also be considered as a way to reduce monthly mortgage payments. A principal reduction would be considered with each combination of rate relief and duration, adding a third dimension to FIG. 8.

Figure 9:
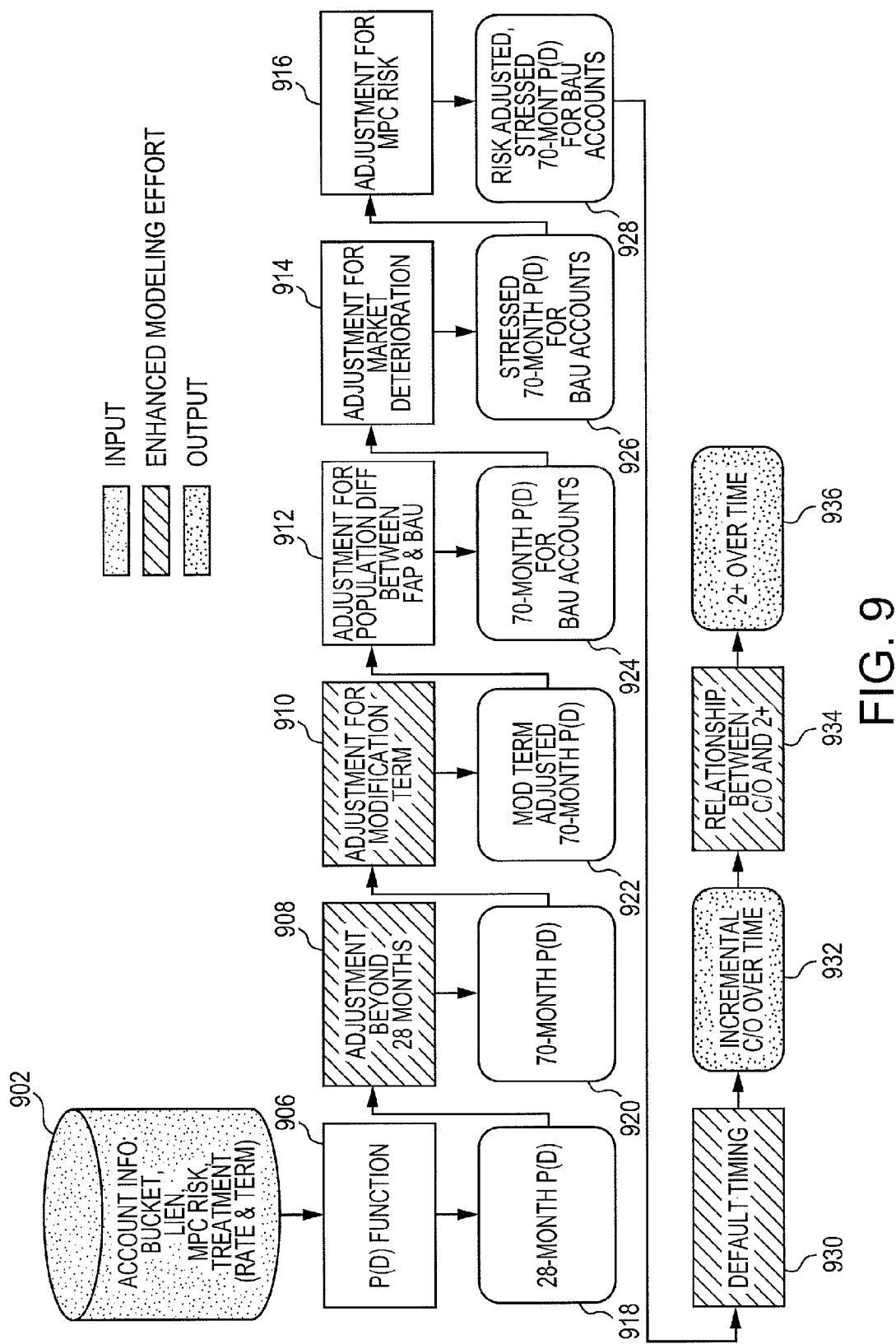
FIG. 9 is a diagram showing further details of the COMET model and adjustments when determining how to modify a loan.

FIG. 9 is a diagram showing further details of the COMET model and adjustments when determining how to determine the probability of default and the 2+ rate. The 2+ rate is the rate of customers who are in default by missing 2 or more payments in a row.

At step 902 account information such as the risk bucket, any liens, and MPC (Market, Product, and Customer). MPC refers to market, product, and customer risk. For market risk, the employment rate versus a housing price index can be compared. For product risk, the type of loan product can be analyzed (e.g. an interest only ARM has higher product risk than some other types of mortgages). Customer risk can include a customer's credit score. Each of these factors can be considered in a binomial High/Low fashion, grouping a customer into one of 8 categories. This is just one example, and more or less categories can also be used.

At step 906, the probability of default function is calculated over a 28 month period. At step 918, an adjustment is applied to determine the P(D) after the 28 month period. This represents just one example adjustment. The probability of default in this example was based on historical data covering a 28 month time period, therefore, an adjustment can be made to the probability of default in 28 months based on this data. In general, historical data can be used to more accurately predict the probability of default. At step 908, adjustments are made for using the model beyond 28 months, and at step 920 the P(D) is obtained over a 70 month period. The adjustment to 70 months covers a portion of the range of relief duration being considered. This allows net present value to be calculated more accurately for relief duration up to at least 70 months.

At step 910, an adjustment to the probability of default model is made for the modification term. This can improve accuracy if the model was based on data for modifications of a certain term, for example 1 year, but the model is applied to a modification for a different term, such as, 2 years. At step 922, the MOD term is adjusted for a 5 year probability of default. At step 912, an adjustment is made for population differences between the foreclosure assistance program (FAP) and business as usual (BAU). At step 924, a 70 month P(D) for BAU accounts is applied. At step 914, an adjustment for market deterioration is used. At step 926, there is a stressed adjustment for 70 month P(D) for BAU accounts. At step 916, there is an adjustment for MPC risk, and at step 928 a risk adjusted, stressed 70 month P(D) is available.

At step 930, all of this is used to modify the default timing. At 932, an adjustment for incremental C/O charge off is applied to realize your loan loss. At step 934, the relationship between C/O and 2+ is established. At step 936, 2+ over time is developed.

Further details of the default modeling are now described with respect to some embodiments of the present invention. For example, in one example, the model includes one or more of the following characteristics:

I. Probability of default modeling: Probability of default is modeled as a logistic function of the delinquency bucket, income relief rate and lien position using historical FAP data.

II. Term-adjusted probability of default: PD modeled using historical FAP data is representative of approximately a 28-month treatment term. In order to obtain PD for treatments of different durations, 28-month PD has been term-adjusted.

III. Probability of default stress factors: Year 2008 is predicted to have significantly higher delinquency as compared to the historically low years of 2004 and 2005. Since PD has been modeled using historical FAP data from September '04 to February '05, PD has been stressed by 2.25 for the CL and 2.7 for the HMS portfolios to account for the expected relative increase in delinquency.

IV. Market-product-customer risk adjusted PD: Market, product and customer risk segmentation was not available for the FAP-approved population between September '04 and February '05. However, it is possible to use the recent delinquency performance of the BAU population of accounts to project PD onto the market, product and customer risk segments.

V. PD adjustment by delinquency bucket: PD function based on FAP was adjusted at the delinquency bucket level to reflect the relative delinquency performance of the general BAU population so that the adjustment factors based on market-product-customer segmentation could be appropriately applied.

VI. Final Stressed PD Tables for different portfolios:

I. Probability of Default Modeling

The response of the probability of default to variations in income relief was evaluated within a logistic regression framework by using historical data from the Foreclosure Avoidance Program (FAP). Given an account i from the CL portfolio that was approved for FAP between September '04 and February '05, the default of account i is said to have occurred if a given account resulted in charge-off or loss on sale within 27 months after FAP approval (observed time window following approval). Then, for example, for i=1, 2, ..., 2001, define, $$D_i = \begin{cases} 1, & \text{if account } i \text{ resulted in } C/O \text{ or} \\ & LOS \text{ within 27 months of } FAP \text{ approval} \\ 0, & \text{if account } i \text{ did not result in } C/O \text{ or} \\ & LOS \text{ within 27 months of } FAP \text{ approval} \end{cases}$$

$$relief_i = \frac{\text{pretreatment } payment_i - \text{posttreatment } payment_i}{\text{pretreatment } payment_i} \times 100,$$

$$bucket_i = \{Current, X - day, 30s, 60s, 90 +\},$$

$$lien_i = \{1st, 2nd\}.$$

Then, the logistic regression model of the binary dependent variable $D_i$ is given by, $$P(D_i = 1 \mid bucket_i, relief_i, lien_i) = F(\beta_0 + \beta_1 bucket_i + \beta_2 relief_i + \beta_3 lien_i)$$

$$= \frac{1}{1 + e^{-(\beta_0 + \beta_1 bucket_i + \beta_2 relief_i + \beta_3 lien_i)}},$$

where $F(\cdot)$ is the cumulative standard logistic distribution function and $\beta_0$, $\beta_1$ and $\beta_2$ are the regression coefficients.

The coefficients of the logistic regression model were estimated using SAS by the method of maximum likelihood. The maximum likelihood estimators are consistent and asymptotically normally distributed so that t-statistics and confidence intervals for the coefficients can be constructed in the standard manner. For details, refer to, for example, Stock, J. H. and M. W. Watson, "Introduction to Econometrics, 2nd Edition," Boston, Mass.: Addison Wesley, 2007 (pp. 384-420). The coefficient estimates are reported below with standard errors in parentheses, where $\hat{P}(\cdot)$ denotes the estimated probability:

$$\hat{P}(D_i = 1 \mid bucket_i, relief_i, lien_i) =$$

$$F\Big(-\underset{(0.241)}{2.11} - \underset{(0.467)}{1.47} Relief_i + \underset{(0.213)}{0.46} DLien_i + \underset{(0.218)}{0.52} DXday_i +$$

$$\underset{(0.221)}{0.69} DThirties_i + \underset{(0.241)}{0.96} DSixties_i + \underset{(0.231)}{1.38} DNinties_i\Big),$$

where the following indicator variables were introduced for lien position and delinquency bucket, $$DLien_i = \begin{cases} 1, & \text{if account } i \text{ is } 2^{nd} \text{ lien} \\ 0, & \text{otherwise} \end{cases},$$

$$DXday_i = \begin{cases} 1, & \text{if account } i \text{ is in the } X - \text{day bucket} \\ 0, & \text{otherwise} \end{cases},$$

$$DThirties_i = \begin{cases} 1, & \text{if account } i \text{ is in the 30s bucket} \\ 0, & \text{otherwise} \end{cases},$$

$$DSixties_i = \begin{cases} 1, & \text{if account } i \text{ is in the 60s bucket} \\ 0, & \text{otherwise} \end{cases},$$

$$DNineties_i = \begin{cases} 1, & \text{if account } i \text{ is in the 90s bucket} \\ 0, & \text{otherwise} \end{cases},$$

Note that all the estimated coefficients are statistically significant at 1% significance level or smaller. The null hypothesis that all regression coefficients (except intercept) are jointly equal to zero is strongly rejected at 1% significance level (LR=57.3~$\chi_6^2$ with a p-value less than 0.001). The c-statistic for assessing the predictive ability of the model is equal to 65%, indicating that the model has adequate power in explaining probability of default, however, that there is still room for improvement.

The c-statistic is a measure of the discriminative power of the logistic model. It varies from 50% (the model's predictions are no better than chance) to 100% (the model always assigns higher probabilities to correct cases than to incorrect cases for any pair involving $D_i=0$ and $D_j=1$). Thus, c is the percent of all possible pairs of cases in which the model assigns a higher probability to a correct case than to an incorrect case. More formally, a pair of observations with different observed responses is said to be concordant if the observation with the lower ordered response value has a lower predicted mean score than the observation with the higher ordered response value. If the observation with the lower ordered response value has a higher predicted mean score than the observation with the higher ordered response value, then the pair is discordant. If the pair is neither concordant nor discordant, it is a tie. Suppose there is a total of t pairs with different responses, n, of them are concordant, $n_d$ of them are discordant, and $t-n_c-n_d$ of them are tied. Then, $c=(n_c+0.5(t-n_c-n_d))/t$.

Term-Adjusted Probability of Default.

In the development sample, approximately 15% are on a permanent FAP program while 25% are re-ups (customers who have participated in the program for at least twice) and 60% are on a 6-month program. All the permanents and re-ups can be assumed similar to a 60-month program yielding an overall weighted average of, 15%×60+25%×60+60%×6=27.6 months.

Therefore, the assumption that the overall base P(D) modeled in Section I is representative of approximately a 24-month FAP program is not unreasonable. In order to obtain P(D) for treatments of different durations, 24-month base P(D) can be adjusted backward and forward as described below.

$$P(D)_{MT} = \frac{1}{\left(\frac{\frac{1}{P(D)_{24}^4} - \frac{1}{P(D)_0^4}}{24} * MT + \frac{1}{P(D)_0^4}\right)^{1/4}}$$

Probability of Default Stress Factors. Methodology Overview.

Stress factor is a factor that is applied to the portfolio to account for overall P(D) change due to credit environment deterioration from base period to target period In current methodology, we used September '04~February '05 CL booking as base period. The stress factors were established based on booking vintage mix from different periods and associated 2+ peak values. 2.25 is applied to CL portfolio and 2.7 is applied to HMS portfolio With a constant stress factor applied to accounts across all delinquency buckets, it's observed P(D) of the lower delinquency accounts were under-stressed while P(D) of the higher delinquency accounts were over-stressed. Therefore, it's proposed to establish different stress factors against different delinquency levels.

Using 90+ ever rate in 6 months as a proxy to evaluate credit environment deterioration, the following charts illustrate methodology proposed to establish stress factors by bucket.

PD adjustment by market-product-customer risk segments. Market, product and customer risk segmentation was not available for the FAP-approved population between September '04 and February '05. However, it is possible to use the recent delinquency performance of the BAU population of accounts to project the probability of default curves illustrated in Section I onto the market, product and customer risk segments.

To obtain the delinquency performance of the BAU population, all CL RE accounts that were 1-89 DOD at EOM April 2007 were evaluated at EOM October 2007 to obtain the 90+ ever rate in 6 months by delinquency bucket, market-product-customer risk segment and lien position. 90+ ever rate in 6 months is being used as a proxy for PD, because the time horizon would be too short to observe charge-off and loss on sale information directly. The adjustment factors for HMS were obtained in a similar manner.

PD adjustment by delinquency buckets. The relative default performance across delinquency buckets is different between the FAP population and the BAU population. Probability of default was modeled using the FAP-approved population while the rho tables were developed based on the general BAU population. To make the rho adjustments applicable, probability of default function based on FAP needs to be adjusted up or down by bucket to reflect the relative performance of the general BAU population.

Therefore, before applying rho tables, the following delinquency based adjustment factors need to be applied. The adjustment factors are obtained by comparing the default performance between the FAP denied customers (as a proxy for the 'do-nothing scenario' of FAP qualified customers) and the regular BAU customers.

More precisely, $$P(D)\_Adj_{Lien,DLQ,MPC} = P(D)\_FAP_{Lien,DLQ} * \text{Stress Factor} * \text{DLQ Factor}_{DLQ} * \rho_{Lien,DLQ,MPC} / \lambda_{28+}$$

where, $P(D)\_FAP_{Lien,DLQ}$ is the projected P(D) based on the FAP P(D) function, Stress Factor varies by portfolio and delinquency level to account for credit environment deterioration, $DLQ\ Factor_{DLQ}$ is the relative performance factor between regular BAU population and FAP population (as shown in the table of 'Recommended Delinquency Level Adjustment for P(D)), $\rho_{Lien,DLQ,MPC}$ is the rho table developed for HMS & CL portfolio, and $\lambda$ is the adjustment for incremental P(D) beyond 28 months. For untreated scenario, $\lambda$ is selected as 0.8. For treated scenario, $\lambda$ is selected as 0.74.

Final result of the section: the distribution of default timing by delinquency bucket and decision group for COMET B and C. Key assumptions in development:

Modification treatment will delay charge off event as accounts will be restructured after modification. Given default, the chance that default happens in month i after treatment follows a negative exponential pattern after the first 28 months The development steps included obtaining smoothed incremental C/O rate curves from month 1 to month 28 since decision by decision group and delinquency bucket on FAP application data between September 2004~November 2004. Identifying the point where APV and DEN charge off curves cross each other. Starting from the crossing point, use exponential function to project future C/O rate up to 70 months based on DEN curve. Obtaining cumulative C/O rate ratios between end point (month 40) and start point based on FAP application data between September 2004~November 2004. Cumulative CIO rate ratio between end point and start point (FAP applications September 2004~November 2004). Apply the ratios to FAP application data between September 2004 February 2006 to obtain incremental C/O rate between start point to end point (month 40).

To obtain the parameters of the exponential function, assume the following: a) At each start point, the incremental C/O rate is the same as what's observed for September 2004~February 2006 application data. b) The incremental CIO rate from the start point to the end point (month 40) is equal to what's derived in step 4.

The following section summarizes parameter solving equations by bucket:

Bucket 0

$x_1 = 27$
$y_1 = 0.37\%$ $$func11: \begin{cases} \frac{b}{a}(e^{a \cdot 40} - e^{a \cdot 27}) = \text{cum\_pd}_{40} - \text{cum\_pd}_{27} = 3.29\% \\ b \cdot e^{a \cdot 27} = pd_{27} = 0.37\% \end{cases}$$

$a = -0.0627 \quad b = 0.0201$

Bucket 1

$x_1 = 28$      1)
$y_1 = 0.39\%$ $$func12: \begin{cases} \frac{b}{a}(e^{a \cdot 40} - e^{a \cdot 27}) = \text{cum\_pd}_{40} - \text{cum\_pd}_{27} = 3.30\% \\ b \cdot e^{a \cdot 27} = pd_{27} = 0.35\% \end{cases}$$

$a = -0.0524 \quad b = 0.0144$

Bucket 2

$x_1 = 22$      2)
$y_1 = 0.68\%$ $$func13: \begin{cases} \frac{b}{a}(e^{a \cdot 40} - e^{a \cdot 22}) = \text{cum\_pd}_{40} - \text{cum\_pd}_{22} = 5.96\% \\ b \cdot e^{a \cdot 22} = pd_{22} = 0.68\% \end{cases}$$

$a = -0.0925 \quad b = 0.0521$

Bucket 3

$x_1 = 26$      3)
$y_1 = 0.47\%$ $$func14: \begin{cases} \frac{b}{a}(e^{a \cdot 40} - e^{a \cdot 26}) = \text{cum\_pd}_{40} - \text{cum\_pd}_{26} = 4.26\% \\ b \cdot e^{a \cdot 26} = pd_{26} = 0.47\% \end{cases}$$

$a = -0.0674 \quad b = 0.0271$

-continued

Bucket 4

$$x_1 = 17 \quad (4)$$
$$y_1 = 0.84\%$$
$$func15: \begin{cases} \frac{b}{a}(e^{a \cdot 40} - e^{a \cdot 17}) = \text{cum\_pd}_{40} - \text{cum\_pd}_{17} = 8.39\% \\ b \cdot e^{a \cdot 17} = pd_{17} = 0.84\% \end{cases}$$
$$a = -0.0864 \quad b = 0.0365$$

The following charts illustrate projected C/O rate over time by bucket and decision group:

7. Smooth the curves using polynomial curves for the first 28 to 30 months.

$$P(D)_i = ai^6 + bi^5 + ci^4 + di^3 + ei^2 + fi + g \text{ for } i <= n, \text{where}$$
$$n = \{28, 29, 30\} \text{ depending on the bucket.}$$

8. Use fitted exponential functions to project monthly C/O rate up to 70 months and obtain cumulative C/O rate from month 1 to month 70 by delinquency bucket and decision group (treated or untreated). Let $P(WTD)_i$=Probability of default in the $i^{th}$ month, given that customer defaults within 70 months. Then, $$P(WTD)_i = \frac{\text{Incre\_P}(D)_i}{P(D)_{70}}.$$

Final result of the section: the distribution of default timing by delinquency bucket and decision group for COMET D and E:

Key assumptions in development: Modification treatment will delay charge off event as accounts will be restructured after modification. Given default, the chance that default happens in month i after treatment follows a negative exponential pattern after the $51^{st}$ month (Base data: January 2004). Development steps: Obtain incremental C/O rate curves from month 1 to month 51 since decision by delinquency bucket on January 2004 BAU data. Identify the exponential curves to project C/O up to 70 months from decision. Smooth the C/O curves.

To recreate treated for BAU population we introduced the cumulative ratio between treated and untreated population from FAP population onto BAU, then the curves are smoothed.

Figure 10:
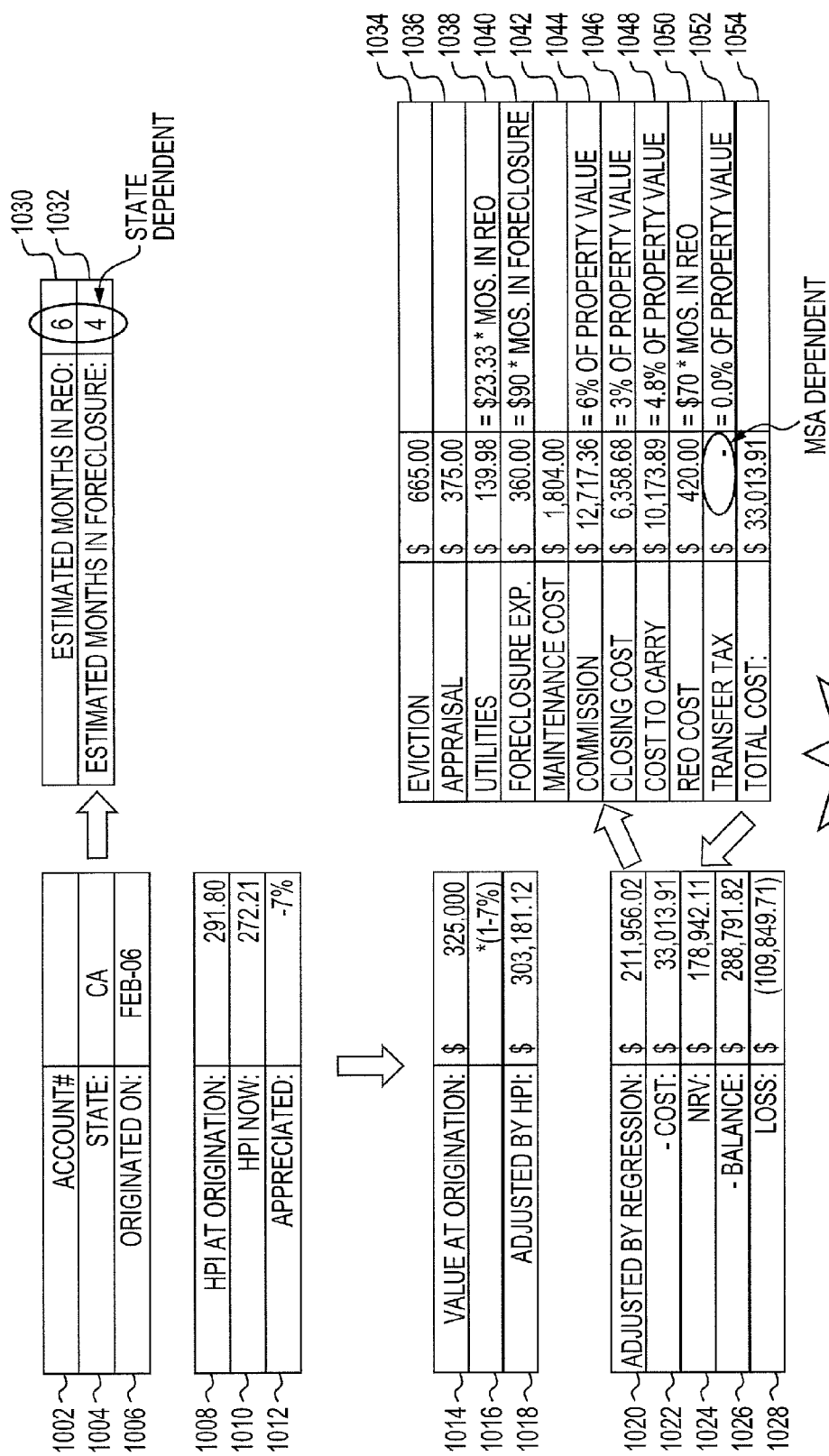
FIG. 10 is an example situation to which COMET could be applied.

FIG. 10 is an example situation to which COMET could be applied. It provides a set of example calculations showing the loss given default for a particular property. In this example, the customer with account number 1002 lives in California 1004, and had a loan that was originated 1006 on February 2006. This chart shows the HPI at origination 1010 and the current HPI 1012. This shows that the house has undergone 7% depreciation 1012 according to HPI. The value of the house art origination 1014 was $325,000, when adjusted by the HPI 1016, this results in a value 1018 of 303,181.12 and when adjusted by regression 1020, results in a value of 211,956.02. When costs 1022 are considered, the property has a NRV 1024 of 178,942.11. Given that the balance of the customer's mortgage 1026 is 288,791.82, this would result in a loss 1028 of 109,849.71 to the lender.

The costs to the lender are shown in the second column, starting with the estimated months in REO 1030 and the estimated months in foreclosure 1032. The costs for default include Eviction costs 1034 of 665, Appraisal costs 1036 of 375, Utility costs 1038 of 139.98 and 23.33 for each month in REO, Foreclosure expenditures 1042 of 360 plus 90 for each more in foreclosure, maintenance costs 1042 of 1804, Commission fees 1044 of 12,717.36 plus 6% of property value, closing costs 1046 of 6,358.68 plus 3% of property value, carrying costs 1048 of 10,173.89 plus 4.8% of property value, REO costs 1050 of 430 plus 70 for each month in REO, and transfer tax 1052, resulting a total cost 1054 of 33,013.91.

By using the above type of analysis a lender can determine what it's loss given the default of a customer would be. This can be used, along with the probability of default, to determine if a loan modification will result in a greater value for the loan.

Figure 11:
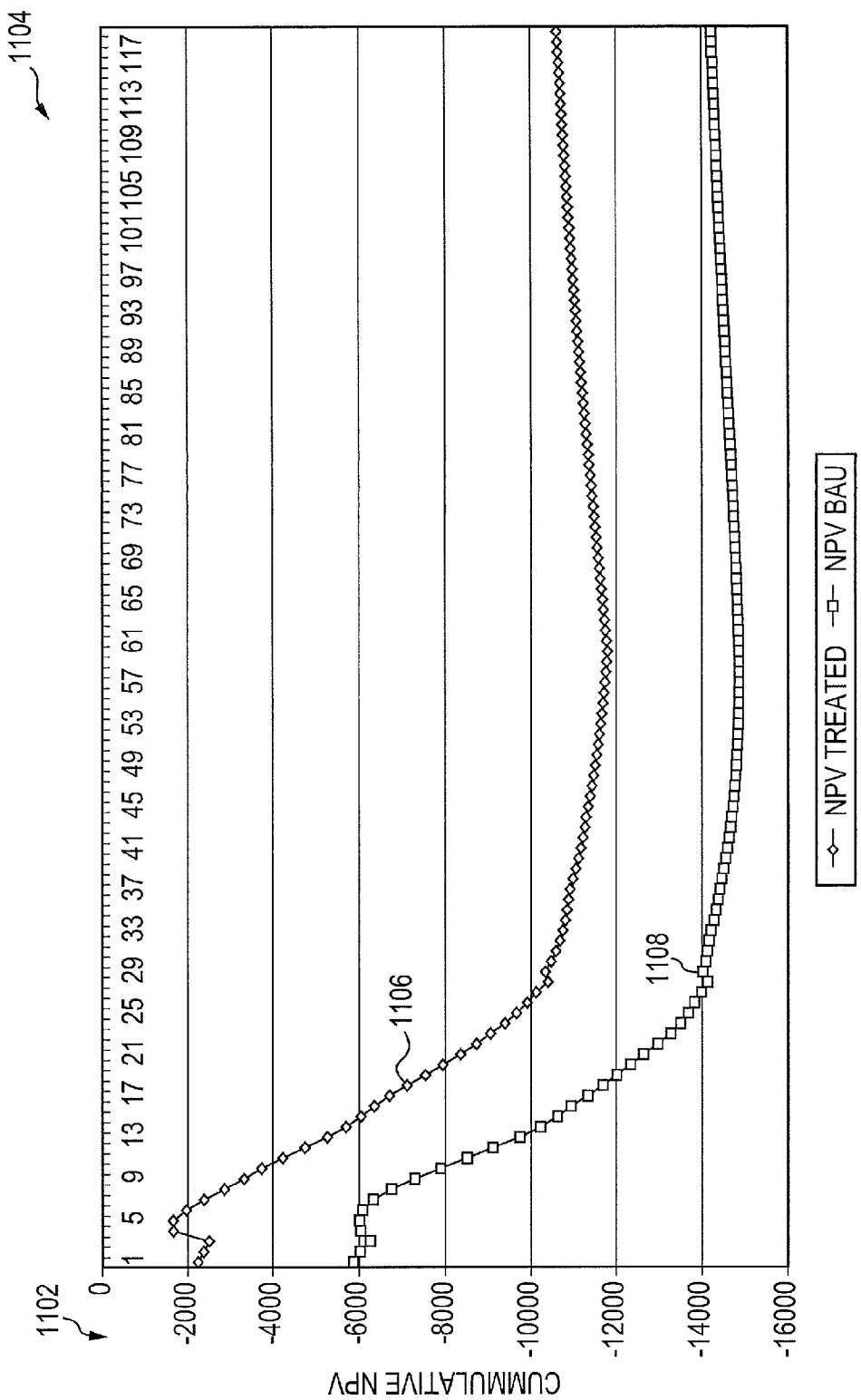
FIG. 11 demonstrates how loan modifications can result in greater net present value (NPV) over the life of a loan.

FIG. 11 demonstrates how loan modifications can result in greater net present value (NPV) over the life of a loan. FIG. 11 shows how a NPV treated loan 1106 is greater over the life of an untreated loan 1108, because of the greater chance that the customer will make payment and not default on the loan.

FIG. 12 is a flow diagram showing how a decision can be made between multiple loan modification programs when providing a loan modification to a customer. One branch of the process starts at 1202 with a submitted FAP application, this database, and data from COMET application are stored in database 1234. This database can be used by the other processing steps and to store the results of processing.

At step 1204, after a FAP application has already been submitted and processed the agent enters the result in the web based interface to the COMET loan modification system. At step 1208 the system sends the FAP and COMET data to the mainframe to receive the loan modification options for each program. At step 1210, the FAP results and COMET results are compared. This comparison can determined based on providing the customer with the larger monthly payment relief. Alternatively, it can be based on the option that has the higher net present value for the lender. In yet another alternative, it can be the one that provides the greatest overall relief to the customer. The results for a program may also be "not available" or "not applicable" for those programs for which the customer does not qualify.

At step 1216, if the application has been FAP approved, then a check is made to see if it has also been COMET approved at step 1214. If the application has also been comet approved, and COMET results in a better outcome than FAP (step 1220), then the customer is entered in the COMET program and this result in saved in the database 1224.

At step 1216 is the customer is not approved for FAP, then at step 1222 it is checked if the customer is approved for COMET. At step 1228, a COMET loan modification is applied if the customer was approved for COMET. Otherwise, at step 1230, no loan modification is applied for the customer.

Figure 13:
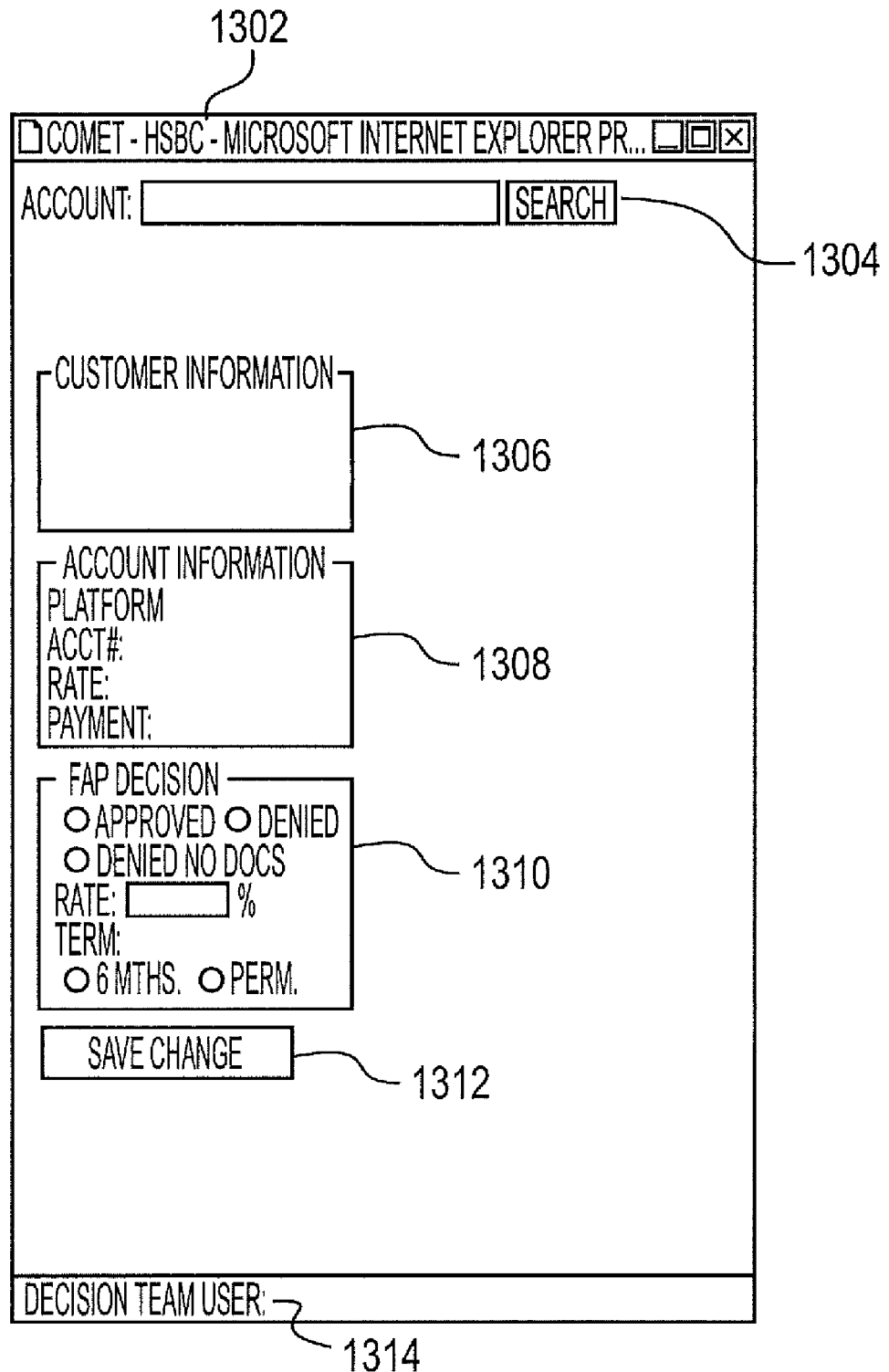
FIG. 13 is a screenshot showing the output of COMET.

FIG. 13 is a screenshot showing the output of COMET. This output is shown within the COMET tool and can be used by a customer service representative or by the customer themselves to review or go through the loan modification process. FIG. 13 shows a web based embodiment of the tool, but any other application platform or technology could be used to develop the tool, including a native application (e.g. Windows application), a java application, or a mobile application.

FIG. 13 shows the account number 1302 and a search tool 1304 for searching for a particular account (e.g. by a member of the modification or adjustment team). After this search, various fields of the interface are populated with the customer's relevant information. The result from FAP can be input into this screen. This screen also shows customer information 1306, for example, the customer name and address. This screen also shows the customer's account information 1308, including the platform their mortgage is being service with (e.g. FiServ), the customer's account number, their interest rate, and their payment amount. This screen also shows the decision made on the customer's account 1310, or alternatively, allows an agent to enter in a loan modification decision. This decision information includes whether the modification was approved or denied, if the reason was lack of documentation, the approved interest rate, and the term of the modification (e.g. 6 months or permanent). The user of the application is also shown at 1314.

Figure 14:
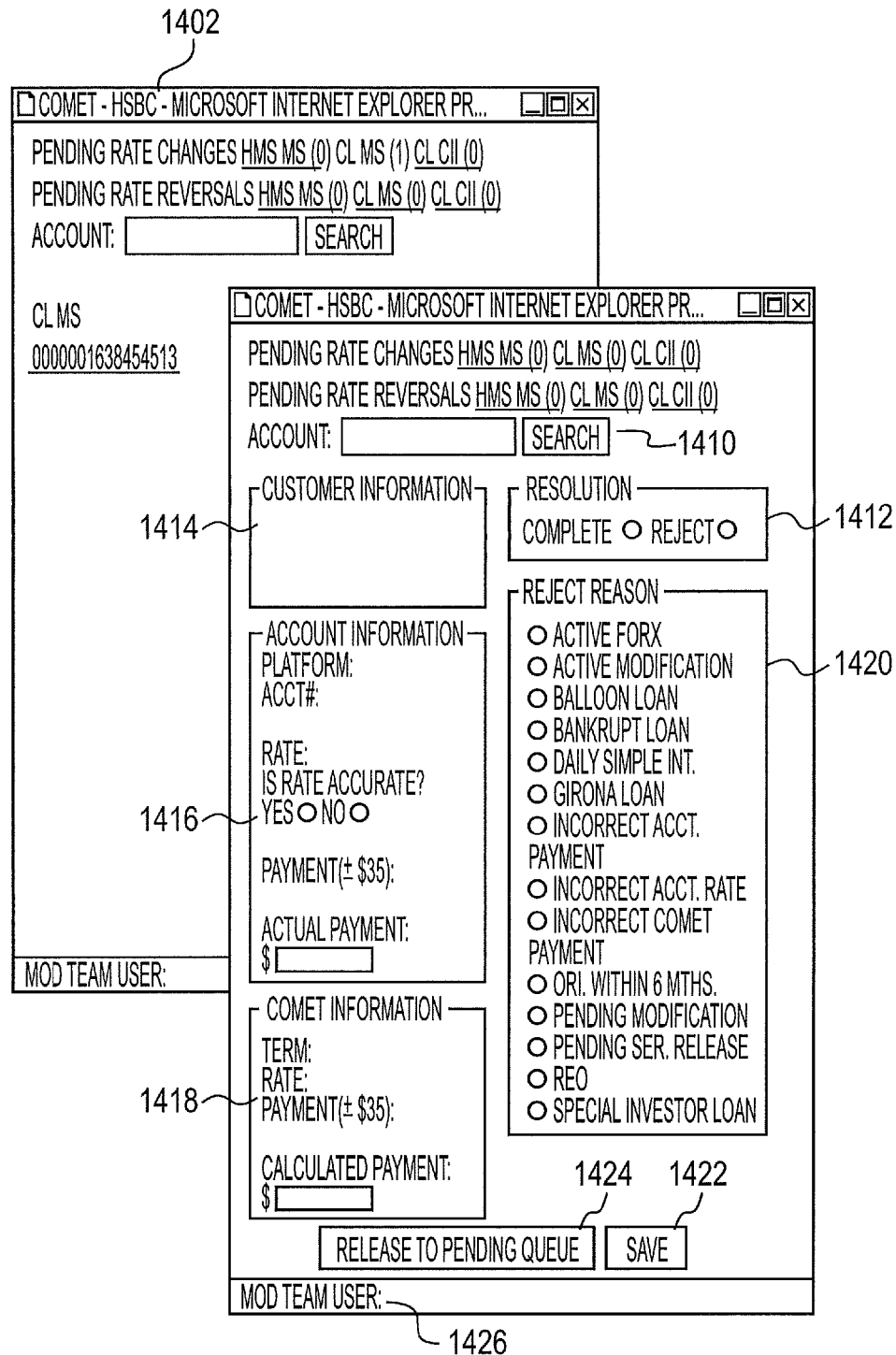
FIG. 14 is a screenshot showing details of a loan modification.

FIG. 14 is a screenshot showing details of a COMET loan modification. This screen also includes an account search tool 1410 allowing different accounts to be easily searched for. This screen also includes customer information 1414 (e.g. name and address) and account information 1416. Account information 1416 includes the platform and account number, as well as, the interest rate, whether the rate is accurate (e.g. something detected in audit), the payment amount, and the actual payment. At 1418, the COMET results about the proposed modification are shown, including the term, the rate, the payment amount, and the calculated payment.

FIG. 14 also shows the resolution of the loan modification 1412, and if the modification was rejected, the reason for the rejection 1420. The agent can perform additional audit at this point, confirming that the customer's situation does not fall into any category that would make them ineligible for a loan modification. For example, the customer may be in the middle of a bankruptcy. After making any changes, the agent can release the loan modification or save the changes 1422 for later. The user of the application is shown at 1426.

Figure 15:
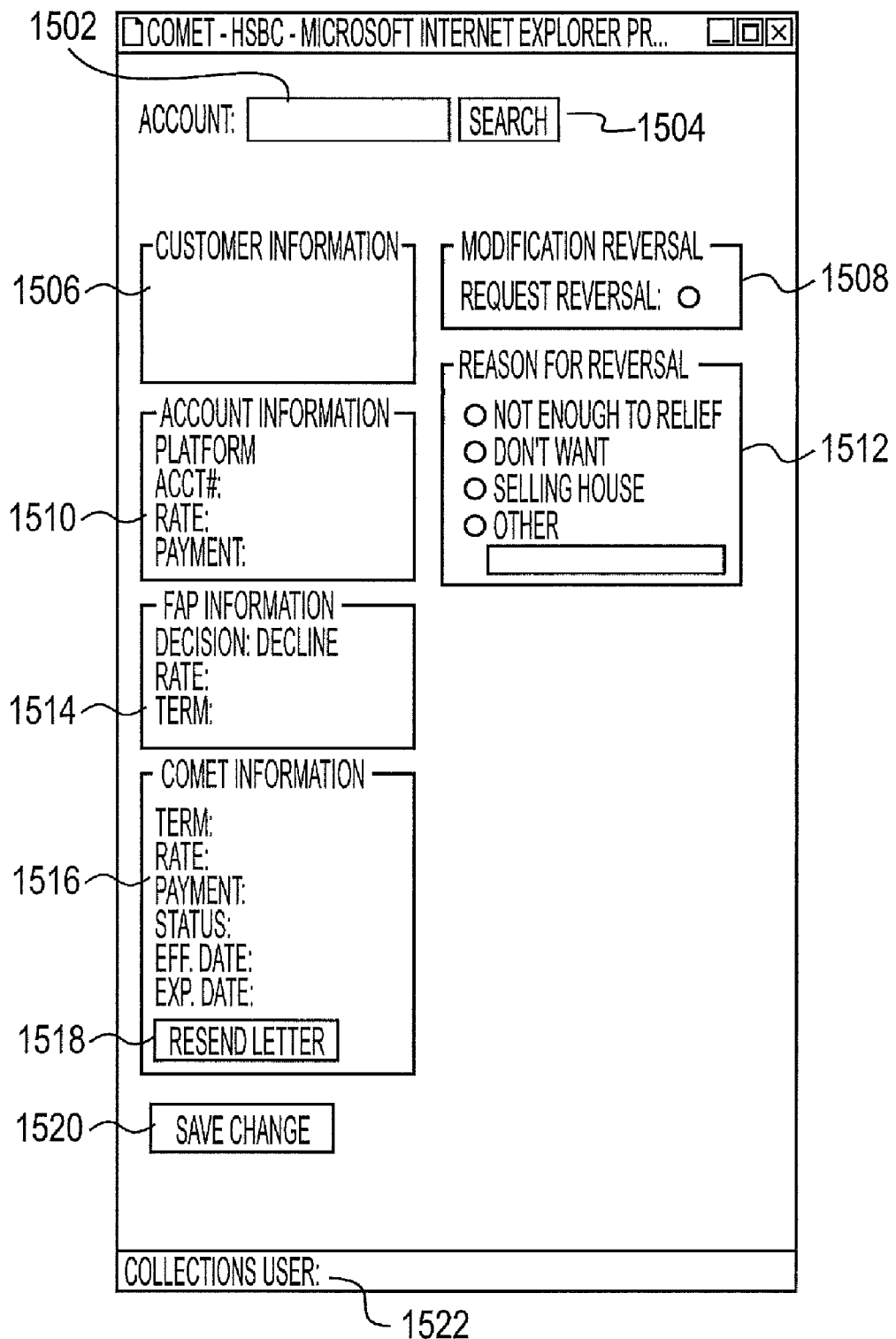
FIG. 15 is a screenshot showing details of a loan modification decision.

FIG. 15 is a screenshot showing details of a COMET decision. Like the other screens, this screen shows the account number 1502, provides an account search feature 1504, shows customer information 1506, and account information 1510.

The actual result of the FAP or COMET loan modification is presented in this screen. Only one of the fields 1514 and 1516 will be populated, depending on the loan modification a customer is receiving.

This screen also allows an agent to reverse a loan modification decision 1508, for example, the customer has not made all payments for the first 6 month of a loan modification. This reversal can have a corresponding reason 1512. This screen also shows the COMET information 1516, including the term, interest rate, payment amount, status, effective date, and expiration date. It also allows the agent to resend the letter (or other notification used) 1518 to the customers. The changes in this screen can be saved using button 1520.

Figure 16:
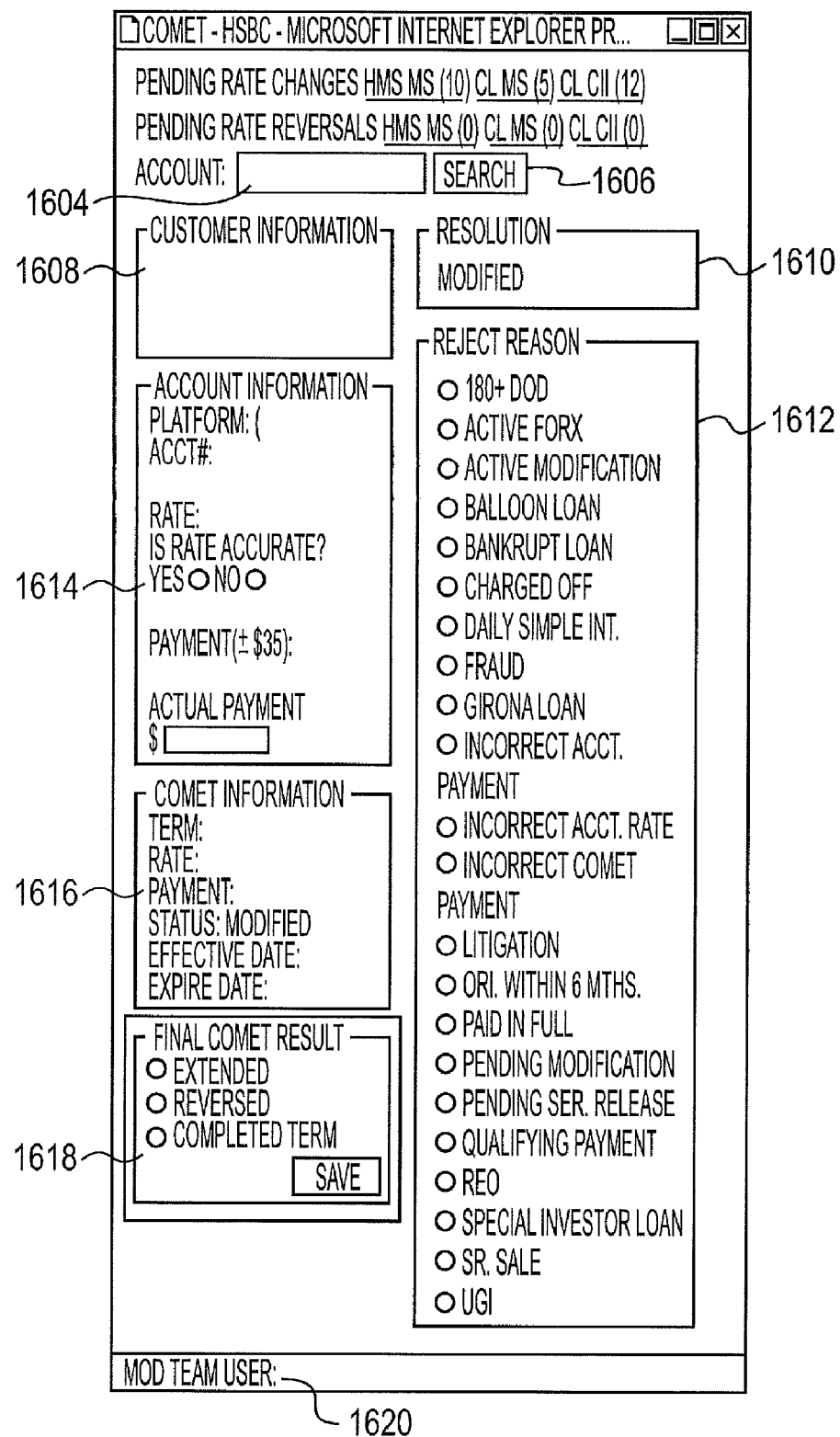
FIG. 16 is a screenshot showing details of a COMET loan modification.

FIG. 16 is a screenshot showing details of the completed loan modification. Like the other screens, this screen shows the account number 1604, provides an account search feature 1606, shows customer information 1608, the account information 1614, and the COMET information 1616. This tool is for the COMET loan modification program, therefore results for the COMET program are shown. A tool for the FAP program would show the FAP results.

This screen also allows an agent to change the final result of the COMET modification 1618, including extending the modification, reversing it, or marking the term as completed. This can be used to make a modification permanent if a customer has complied with all the terms of a loan modification for a period of time. Similar to FIG. 15, this screen also shows the resolution 1610, and the reason for the resolution 1612.

Other embodiments, extensions and modifications of the ideas presented above are comprehended and within the reach of one versed in the art upon reviewing the present disclosure. Accordingly, the scope of the present invention in its various aspects should not be limited by the examples and embodiments presented above. The individual aspects of the present invention and the entirety of the invention should be regarded so as to allow for such design modifications and future developments within the scope of the present disclosure. The present invention is limited only by the claims that follow.

What is claimed is:

1. A computer implemented method, executed by a computer system having a computer processor, for automatically modifying the terms of a plurality of mortgages within a portfolio of mortgages, such that monthly payments for the plurality of mortgages are reduced, the method comprising:
    calculating by the computer processor a current net present value for each of the mortgages in the portfolio of mortgages;
    calculating by the computer processor a plurality of future net present values for each of the mortgages in the portfolio, each future net present value corresponding to one set of proposed modified loan terms;
    determining by the computer processor the largest calculated future net present value for each of the mortgages in the portfolio; and
    automatically generating by the computer processor the loan terms of each of the plurality of mortgages where the largest future net present value is greater than the current net present value, wherein the loan terms for each of the mortgages in the portfolio are modified to correspond to the proposed modified loan terms resulting in the largest net present value.

2. The method of claim 1, further comprising:
    allowing by the computer processor a customer to opt-out of the automatic loan modification for a period of time.

3. The method of claim 2, wherein the period of time is 30 days.

4. The method of claim 1, further comprising:
    after modifying the loan terms for a mortgage, notifying the borrower for the mortgage that the borrower's loan terms have been modified and providing information on the modified loan terms, wherein the notification is provided through at least one of an email, a mailing, an automated phone call, and a live call.

5. The method of claim 1, further comprising:
    retracting the modified loan terms in response to a mortgage customer's failure to comply with the terms of their modified mortgage.

6. The method of claim 1, further comprising calculating by the computer processor a future net present value by calculating the loss given default of the mortgage, the cost to the lender of the mortgage of the modified loan terms, and the probability of default given the modified loan terms, wherein the calculated future net present value is the current value of the mortgage, reduced by the product of the loss given default and the probability of default, and reduced by the cost to the lender of the modified loan terms.

7. The method of claim 6, further comprising using by the computer processor at least one of market, customer, and product risk factors in said calculating of the future net present value.

8. The method of claim 7, wherein a borrower is assigned to a risk category, and wherein the risk category is at least one of low, medium, and high.

9. The method of claim 8, wherein customer risk factors include at least one of credit score, income, payment history, other debt, and joint loan.

10. The method of claim 8, wherein the product risk factors include at least one of the type of loan, loan to value ratio, and lien position.

11. The method of claim 8, wherein the market risk factors include at least one of geographical location, housing price indexes, real disposable income per capita, unemployment rate, and industry loan to value ratio.

12. The method of claim 11, wherein the geographical area is at least one of a county, state, and metropolitan division.

13. The method of claim 1, further comprising:
automatically performing by the computer processor a second modification to the loan terms of a mortgage within the portfolio of mortgages.

14. The method of claim 1, further comprising filtering by the computer processor mortgages in the portfolio of mortgages where the net benefit to the lender is greater than a threshold amount.

15. The method of claim 1, further comprising filtering by the computer processor mortgages where the net benefit to the lender is greater than a threshold amount.

16. The method of claim 1, further comprising filtering by the computer processor mortgages in the portfolio of mortgages where the borrower is delinquent with the loan terms of their current loan.

17. A computer implemented system for automatically modifying the terms of a plurality of mortgages within a portfolio of mortgages, such that, monthly payments for the plurality of mortgages are reduced, the system comprising:
a computer implemented server system, having at least one computer processor, processing and calculating a current net present value for each of the mortgages in the portfolio of mortgages, wherein data on the mortgages is received from a database through a communication network;
the computer processor calculating a plurality of future net present values for each of the mortgages in the portfolio, each future net present value corresponding to one set of proposed modified loan terms;
the computer processor determining the largest calculated future net present value for each of the mortgages in the portfolio;
the computer processor automatically generating the loan terms of each of the plurality of mortgages where the largest future net present value is greater than the current net present value, wherein the loan terms for each of the mortgages in the portfolio are modified to correspond to the proposed modified loan terms resulting in the largest net present value; and
the computer processor updating mortgage data in the database in accordance with the modified loan terms.

18. The system of claim 17, further comprising:
the computer processor allowing a customer to opt-out of the automatic loan modification for a period of time.

19. The system of claim 18, wherein the period of time is 30 days.

20. The system of claim 17, further comprising:
a communication device, enabling the notifying of a borrower for a mortgage that the borrower's loan terms have been modified once the loan terms for the mortgage have been modified, and providing information on the modified loan terms, wherein the notification is provided through at least one of an email, a mailing, an automated phone call, and a live call.

21. The system of claim 17, further comprising:
retracting the modified loan terms in response to a mortgage customer's failure to comply with the terms of their modified mortgage.

22. The system of claim 17, further comprising the computer processor calculating a future net present value by calculating the loss given default of the mortgage, the cost to the lender of the mortgage of the modified loan terms, and the probability of default given the modified loan terms, wherein the calculated future net present value is the current value of the mortgage, reduced by the product of the loss given default and the probability of default, and reduced by the cost to the lender of the modified loan terms.

23. The system of claim 22, wherein the computer processor further uses at least one of market, customer, and product risk factors in said calculating of the future net present value.

24. The system of claim 23, wherein the computer processor further assigns a borrower to a risk category, wherein the risk category is at least one of low, medium, and high.

25. The system of claim 24, wherein customer risk factors include at least one of credit score, income, payment history, other debt, and joint loan.

26. The system of claim 23, wherein the product risk factors include at least one of the type of loan, loan to value ratio, and lien position.

27. The system of claim 23, wherein the market risk factors include at least one of geographical location, housing price indexes, real disposable income per capita, unemployment rate, and industry loan to value ratio.

28. The system of claim 27, wherein the geographical area comprises at least one of a county, state, and a metropolitan division.

29. The system of claim 17, further comprising:
the computer processor automatically performing a second modification to the loan terms of a mortgage within the portfolio of mortgages.

30. The system of claim 17, wherein the computer processor filters mortgages in the portfolio of mortgages where the net benefit to the lender is greater than a threshold amount.

31. The system of claim 17, wherein the computer processor filters mortgages where the net benefit to the lender is greater than a threshold amount.

32. The system of claim 17, wherein the computer processor filters mortgages in the portfolio of mortgages where the borrower is delinquent with the loan terms of their current loan.

33. A computer implemented method, executed by a computer system having a computer processor, for automatically modifying the terms of a plurality of mortgages within a portfolio of mortgages, such that monthly payments for the plurality of mortgages are reduced, the method comprising:
determining by the computer processor a customer's eligibility for a first loan modification using a first set of rules, wherein eligibility is based on at least the customer's disposable income;
determining by the computer processor the customer's eligibility for a second loan modification using a second set of rules, wherein eligibility is based on the net present value of the loan, and wherein determining net present value comprises calculating a plurality of future net present values for the customer's mortgage, each future net present value corresponding to one set of proposed modified loan terms;
determining by the computer processor a one of the first and second loan modifications providing the greatest payment relief to the customer; and
automatically generating by the computer processor the loan terms of the customer's mortgage in accordance with the determined one of the first and second loan modifications.

34. The method of claim 33, further comprising:
allowing the customer to opt-out of the automatic loan modification for a period of time.

35. The method of claim 33, further comprising selecting by the computer processor the one of the first and second loan modifications that provides the greatest monthly payment relief to the customer.

36. The method of claim 33, further comprising:
after the generating of the loan terms, modifying the loan terms for the customer's mortgage, notifying the borrower for the mortgage that the borrower's loan terms have been modified, and providing information on the modified loan terms, wherein the notification is provided through at least one of an email, a mailing, an automated phone call, and a live call.

37. The method of claim 36, further comprising:
retracting the modified loan terms in response to the customer's failure to comply with the terms of the modified mortgage.

38. The method of claim 33, further comprising calculating by the computer processor a future net present value by calculating the loss given default of the mortgage, the cost to the lender of the mortgage of the modified loan terms, and the probability of default given the modified loan terms, wherein the calculated future net present value is the current value of the mortgage, reduced by the product of the loss given default and the probability of default, and reduced by the cost to the lender of the modified loan terms.

39. The method of claim 38, further comprising using by the computer processor at least one of market, customer, and product risk factors in calculating the future net present value.

40. The method of claim 39, wherein a borrower is assigned to a risk category, and wherein the risk category is at least one of low, medium, and high.

41. The method of claim 33, further comprising:
automatically performing by the computer processor a second modification to the loan terms of the customer's mortgage.

42. The method of claim 1, wherein the step of calculating by the computer processor a plurality of future net present values for each of the mortgages in the portfolio, further comprises:
simulating, by the computer processor, a plurality of treatment options for each of the mortgages in the portfolio, wherein each simulation accounts for at least one of probability of default, loss given default, at least one loan characteristic, and at least one financial variable, in creating a treatment option.

43. The method of claim 42, wherein each simulation outputs a net present value of expected future cash flow associated with each treatment option.

44. The system of claim 17, wherein the computer processor, in calculating the plurality of future net present values for each of the mortgages in the portfolio, is further configured to simulate a plurality of treatment options for each of the mortgages in the portfolio, each simulation accounting for at least one of probability of default, loss given default, at least one loan characteristic, and at least one financial variable, in creating a treatment option.

45. The system of claim 44, wherein each simulation outputs a net present value of expected future cash flow associated with each treatment option.

46. The method of claim 33, wherein the step of calculating a plurality of future net present values for the customer's mortgage comprises:
simulating, by the computer processor, a plurality of treatment options for the customer's mortgage, wherein the simulation accounts for at least one of probability of default, loss given default, at least one loan characteristic, and at least one financial variable, in creating each treatment option.

47. The method of claim 46, wherein the simulation outputs a net present value of expected future cash flow associated with each treatment option.

* * * * *